US012698941B2

(12) United States Patent
Aleman et al.

(10) Patent No.: US 12,698,941 B2
(45) Date of Patent: Aug. 4, 2026

(54) SYSTEMS, METHODS AND DEVICES FOR COOLING TOWER MAINTENANCE AND REPAIR

(71) Applicants: Javier Aleman, Winder, GA (US); Kevin McBurney, Bowman, GA (US)

(72) Inventors: Javier Aleman, Winder, GA (US); Kevin McBurney, Bowman, GA (US)

( * ) Notice: Subject to any disclaimer, the term of this patent is extended or adjusted under 35 U.S.C. 154(b) by 184 days.

(21) Appl. No.: 18/665,251

(22) Filed: May 15, 2024

(65) Prior Publication Data

US 2025/0012508 A1 Jan. 9, 2025

Related U.S. Application Data

(60) Provisional application No. 63/466,542, filed on May 15, 2023.

(51) Int. Cl.

| | |
|---|---|
| ***F28G 1/16*** | (2006.01) |
| ***B05B 7/28*** | (2006.01) |
| ***B08B 3/02*** | (2006.01) |
| *F28C 1/12* | (2006.01) |

(52) U.S. Cl.

CPC ................ *F28G 1/166* (2013.01); *B05B 7/28* (2013.01); *B08B 3/024* (2013.01); *F28C 1/12* (2013.01)

(58) Field of Classification Search

CPC ... F28C 1/00; F28C 1/12; B08B 3/024; B08B 9/023; B08B 9/0321; B05B 7/28; B05B 7/30

See application file for complete search history.

(56) References Cited

U.S. PATENT DOCUMENTS

| | | | | |
|---|---|---|---|---|
| 2012/0161340 A1* | 6/2012 | Sween | F28C 1/16 | 261/153 |
| 2012/0241988 A1* | 9/2012 | Park | F28C 1/00 | 261/112.1 |
| 2013/0087291 A1* | 4/2013 | Ruisinger | F28F 27/003 | 159/49 |
| 2018/0164054 A1* | 6/2018 | Shin | F28F 25/02 | |

FOREIGN PATENT DOCUMENTS

| | | | |
|---|---|---|---|
| DE | 19949786 A1 * | 4/2001 | A47L 11/4088 |

* cited by examiner

*Primary Examiner* — Michael E Barr
*Assistant Examiner* — Kevin G Lee
(74) *Attorney, Agent, or Firm* — Smith Tempel Blaha LLC; Matthew T. Hoots

(57) ABSTRACT

A solution for cooling tower maintenance and repair including a hydro-power tool for cleaning beneath low hanging cooling tower fills, a tool for accessing between hanging cooling tower fills, a system for removing gas and other non-compressibles from an effluent flow while cleaning a cooling tower basin, and various hydro-booster components for interjecting a motive force of high pressure water into a vacuumed flow or an effluent flow while cleaning a cooling tower basin. The hydro-power tool operates under negative pressure produced by high-pressure nozzles within the interior of the hydro-power tool body. The hydro-boosters are fed by a high-pressure water manifold and include high-pressure nozzles that are angled into the flow path of a tube to increase the negative pressure.

19 Claims, 21 Drawing Sheets

SYSTEMS, METHODS AND DEVICES FOR COOLING TOWER MAINTENANCE AND REPAIR

CROSS-REFERENCE TO RELATED APPLICATIONS

This is a utility patent application being filed in the United States as a non-provisional application for patent under Title 35 U.S.C. § 100 et seq. and 37 C.F.R. § 1.53(b) and, claiming the benefit of the prior filing date under Title 35, U.S.C. § 119(e) of the United States provisional application for patent that was filed on May 15, 2023 and assigned Ser. No. 63/466,542, which application is incorporated herein by reference in its entirety.

BACKGROUND

The present inventions relate to systems and methods for the maintenance and repair of cooling towers.

Those skilled in the art understand that a cooling tower is a heat removal device that uses water to transfer process waste heat into the atmosphere. An industrial cooling tower operates on the principle of removing heat from water by evaporating a small portion of water that is recirculated through the unit. The mixing of warm water and cooler air releases latent heat of vaporization, causing the water to cool.

Cooling towers are essentially large boxes designed to maximize evaporation as a means for removing thermal energy from water. To accomplish this evaporative cooling, cooling towers house material, typically PVC plastic sheets commonly referred to in the industry as "fill," that create large surface areas for water evaporation to occur.

Commercial cooling towers work by pumping water to the top of the tower and then allowing the water to flow down through the fill material to collect in a basin. Some designs spray the water into the fill, while other designs allow the water to feed into the fill gravitationally. Either way, as the water flows through the fill, latent heat from vaporization is released when the warm water comes in contact with cool air provided by an electrical fan and/or ambient breezes (cooling towers are often located outside). Cooling towers that leverage an electrical fan to create an air draft or airflow through the cooling tower fill are typically referred to as "induced" or "force draft" or "induced draft" type cooling towers.

There are two basic types of induced draft cooling towers: "counter-flow" cooling towers and "cross-flow" cooling towers. FIG. 1A is a functional diagram of a counter-flow cooling tower. In a counter-flow cooling tower 100, such as that illustrated in FIG. 1A, the air flow 110, and water flow 120 are counter to each other. The air flow 110 is shown as traveling upwards as fan 112 draws dry air 114 into the system and up through the fill material 124. The water flow 120 is shown as traveling downwards as the hot water 122 is introduce into the distribution system 126 and broadcast through spray nozzles 128. As the water flows downward through the fill 124, it comes into contact with the air flow 110 flowing vertically upwards through the fill 124. The cooled water falls into the collection basin 130 and cold or cooled water 132 then exits or is extracted from the counter-flow cooling tower 100.

FIG. 1B is a functional diagram of a cross-flow cooling tower. In a cross-flow cooling tower 150, such as that illustrated in FIG. 1B, the air flow 160 and water flow 170 cross or are orthogonal to each other. The air flow 160 is shown as dry air 164 is drawn into and through the fill 174 by fan 162. Hot water 172 enters the system through a distribution basin 176 and flows downward through the fill 174. The water flow 170 results in the water coming into contact with air flowing horizontally across and through the fill 174. The cooled water falls into the collection basin 180 and cold or cooled water 182 then exits or is extracted from the counter-flow cooling tower 100.

Counter-flow cooling towers tend to have a smaller footprint and operating weight than cross-flow cooling towers; however, they tend to have a higher water pressure drop due to the pressurized spray system, whereas most cross-flow towers use a gravity-fed water distribution pan.

Whether cross-flow or counter-flow, proper and routine maintenance is an absolute necessity to keep a cooling tower running at peak efficiency. Regular cleaning, scale removal, trash removal, and water treatment all play important roles in cooling tower maintenance. As one of ordinary skill in the art would acknowledge, water collects for relatively long periods of time in a cooling tower, such as in its distribution subsystem, and so presents ample opportunity for bacterial growth (e.g., *Legionella*). Similarly, organics, trash, and other contaminants find their way into the cooling tower to clog the fill or accumulate in the basin, thereby reducing the efficiency of the overall system and compromising components. Further, minerals present in the water are prone to stick to the fill to form a scale when the water is evaporated.

Further to the above, there are four major types of water treatment issues in cooling towers: biological contamination, corrosion, fouling and scaling. All of these problems reduce a cooling tower's ability to be energy efficient, thereby increasing the electrical demand of the cooling tower to do its job. As one of ordinary skill in the art would recognize, increased electrical demand results in increased cost. Consequently, systems, methods, and devices that work to overcome or mitigate these issues in cooling towers are desirable.

Biological Contamination—Cooling towers by nature are places that are hot and humid. Along with the common and plentiful nutrients that most water sources contain, a cooling tower can present an ideal place for the growth of unwanted biologics, such as bacteria, that are not only detrimental to people but are destructive to the cooling tower. For example, biofilm, which is a build-up of bacteria on the internal components of a cooling tower, can reduce the effective cooling range dramatically.

Corrosion—The air, dissolved solids, and other chemicals entrained in the water of a cooling tower can eat away at the metal components of the cooling tower system, leading to leaks and excessive use of makeup water.

Fouling—Fouling can occur at different areas of a cooling tower system, the fill being the most common area for fouling to occur. Fouling is the clogging of cooling surfaces with debris, dirt, and dust. As one of ordinary skill in the art would recognize, fouling prevents water from passing through the fill as designed, resulting in a reduced efficiency.

Scaling—Different types of minerals common in water, like calcium as a non-limiting example, are deposited on the cooling tower fill when water is evaporated. As one of ordinary skill in the art would recognize, scaling prevents the fill from working as designed, resulting in a reduced efficiency.

To combat these various cooling tower efficiency killers, biocides and other chemical cleaning solutions are circulated through the system and flushed out. The fill and basins are pressure washed and/or vacuumed out, scale is dissolved or cleaned, and components are regularly inspected. Regardless of the type of maintenance a given cooling tower requires, it is often desirable that the maintenance be accomplished without taking the cooling tower offline. And, it is always desirable that the maintenance be accomplished in an efficient manner with effective results. Therefore, there is a need in the art for systems, methods, and devices that can be employed in the maintenance of cooling towers.

SUMMARY

Exemplary embodiments of systems, methods, and devices for cooling tower maintenance and repair are disclosed. Embodiments of the solutions include a hydro-power tool for cleaning beneath low hanging cooling tower fills, a tool for accessing between hanging cooling tower fills, a system for removing gas and other non-compressibles from an effluent flow while cleaning a cooling tower basin, and various hydro-booster components for interjecting a motive force of high pressure water into a vacuumed flow or an effluent flow while cleaning a cooling tower basin.

An overall general embodiment includes a system for maintenance of a cooling tower. As those skilled in the relevant art will understand, a typical cooling tower includes a plurality of hanging fill sheets and a cool water basin at the bottom of the plurality of fill sheets. The embodiment includes at least one hanging fill access tool. The tool includes a flat elongated arm with and a handle associated with the proximate end of the flat elongated arm. The elongated arm has a width D which is sufficient to cause a separation between two adjacent fill sheets when the width D is turned to extend between the facing surfaces of the two adjacent fill sheets. An anchor associated with a distal end of the handle. Upon sliding the flat elongated arm between a first fill sheet and a second fill sheet, the handle can be rotated to a horizontal position causing the flat elongated arm to turn with the flat side up and thereby separating the first fill sheet and the second fill sheet. The system also includes a limited access hydro-power cleaning tool having tool body defining a fluid path between a distal end and a proximate end. The tool body includes an open mouth associated with the distal end and a nozzle associated with the proximate end. One or more inverted nozzles are associated with the distal end of the tool body and direct high-pressure water at an angle towards the proximate end of the tool body. This results in a negative pressure that produces a suction at the open mouth. The system also includes a scrubber that is fluidly associated with the nozzle of the hydro-power cleaning tool. The hydro-power cleaning tool can be inserted into cool water basin and extract water laden with debris from the cool water basin and deliver it to the scrubber to remove debris from the extracted water. The limited access hydro-power cleaning tool has a height of 1 inch or less.

In some embodiments, the system may include one or my hydro-booster components. The hydro-booster components include a clam shell casing that is clamped and held around a hose. One or more high-pressure tubes terminating with high-pressure nozzles are mounted in the clam shell casings. The high-pressure nozzles are angled in a particular direction the one or more hydro-booster components are mounted onto a fluid path in the system such that the high-pressure nozzles are angled in the direction of a flow path within the fluid path, whereby the hydro-booster increases the negative pressure within the fluid path to increase a flow rate within the fluid path.

The scrubber in various embodiments of the system may include a mechanical pump vessel fluidly associated with the nozzle of the limited access hydro-power cleaning tool. Extracted water with debris and be received from the basin into the mechanical pump vessel. The scrubber also includes an air evacuation tank fluidly associated with the mechanical pump vessel.

In some embodiments, the mechanical pump vessel is positioned vertically below the air evacuation tank. Such embodiments include a large diameter hose creating a fluid path from the lower side of the air evacuation tank to the upper side of the mechanical pump vessel. Further, such embodiments include a small diameter hose creating a fluid path from the upper side of the mechanical pump vessel to the upper side of the air evacuation tank. In such embodiments, gases existing in the mechanical pump vessel is forced into the small diameter hose such that gases can be extracted at the air evacuation tank.

In some embodiments, the large diameter hose has a shut off valve and the small diameter hose has a shut off valve, whereby when the large diameter hose shut off valve is open and the small diameter hose shut off valve is open, the combination of water weight and gravity force the gases from the mechanical pump vessel to the air evacuation tank.

In some embodiments, the air evacuation tank includes a water makeup inlet, whereby volume eliminated by extracted gases can be replaced by water.

Embodiments of the system may include a water distribution pressure regulating manifold that provides pressurized water to one or more of the hydro-boosters.

Further, system embodiments may include a pressure washer that can be used to clean debris from the fill sheets. The pressure washer may include a feed hose fluidly associated with the scrubber and a hydro-booster associated with the feed hose. In such embodiments water scrubbed by the scrubber can be pressurized and delivered to the pressure washer for cleaning the fill sheets.

Some embodiments may also include a strainer inline between the limited access hydro-power cleaning tool and the mechanical pump vessel, whereby dirt and debris can be filtered from the water being provided to the mechanical pump vessel.

In some embodiments, one or more hydro-booster components may be included that are constructed with quick-connect connectors so that they can be inserted inline with a hose.

These and other aspects of the invention are presented in greater detail below.

DETAILED DESCRIPTION

If used in this description, the following terms have the meanings set forth below.

"Wet-bulb temperature" means the lowest temperature that may be achieved by evaporative cooling of a water-wetted, ventilated surface (i.e., cooling tower fill).

"Approach" means the difference between the temperature of the cold water leaving the tower and the air's wet-bulb temperature. The establishment of the approach fixes the operating temperature of the tower and is an important parameter in determining both tower size and cost.

"Bleed off" means the circulating water in the tower which is discharged to waste to help keep the dissolved solids concentration of the water below a maximum allowable limit in an effort to mitigate scaling in the fill. As a result of evaporation, dissolved solids concentration will continually increase unless reduced by bleed-off.

"Biocide" refers to a chemical that is designed to control the population of troublesome microbes.

"Blowdown" refers to the water (usually measured in GPM) that is purposely discharged from a cooling tower system to control concentrations of salts or other impurities in the circulating water.

"Cooling range" means the difference in temperature between the hot water entering the cooling tower and the cold water leaving the tower from its basin.

"Dissolved solids" refers to the total solids that have been dissolved into the water that is cycling through a cooling tower.

"Drift" refers to the water entrained in the airflow of a cooling tower and discharged into the atmosphere. Drift loss does not include water lost by evaporation.

"Makeup" means the amount of water required to replace normal losses of water in a cooling tower system caused by bleed-off, drift, and evaporation.

"Pumping head" or "head" refers to the pressure required to pump water from a cooling tower basin through the entire system and return to the top of the tower.

Various embodiments, aspects and features of the present inventions encompass systems, methods, and devices particularly suited for cooling tower maintenance and repair. Further configurations and advantages and uses of the solutions will occur to those of skill in the art reviewing the figures and description that follows.

Water Tower Maintenance System

The various embodiments presented herein include different systems, sub-systems, apparatuses, etc. that can all operate together to provide a novel maintenance system for a water tower. However, it will also be appreciated that while the system is considered to be a novel invention, several of the individual components of the system are also considered to be novel inventions as well. The water tower maintenance system is first described and presented as an overall maintenance system. The water tower maintenance system (WTMS) will be presented in a general, high-level format and then several of the individual components will then be described in greater detail.

Figure 1A:
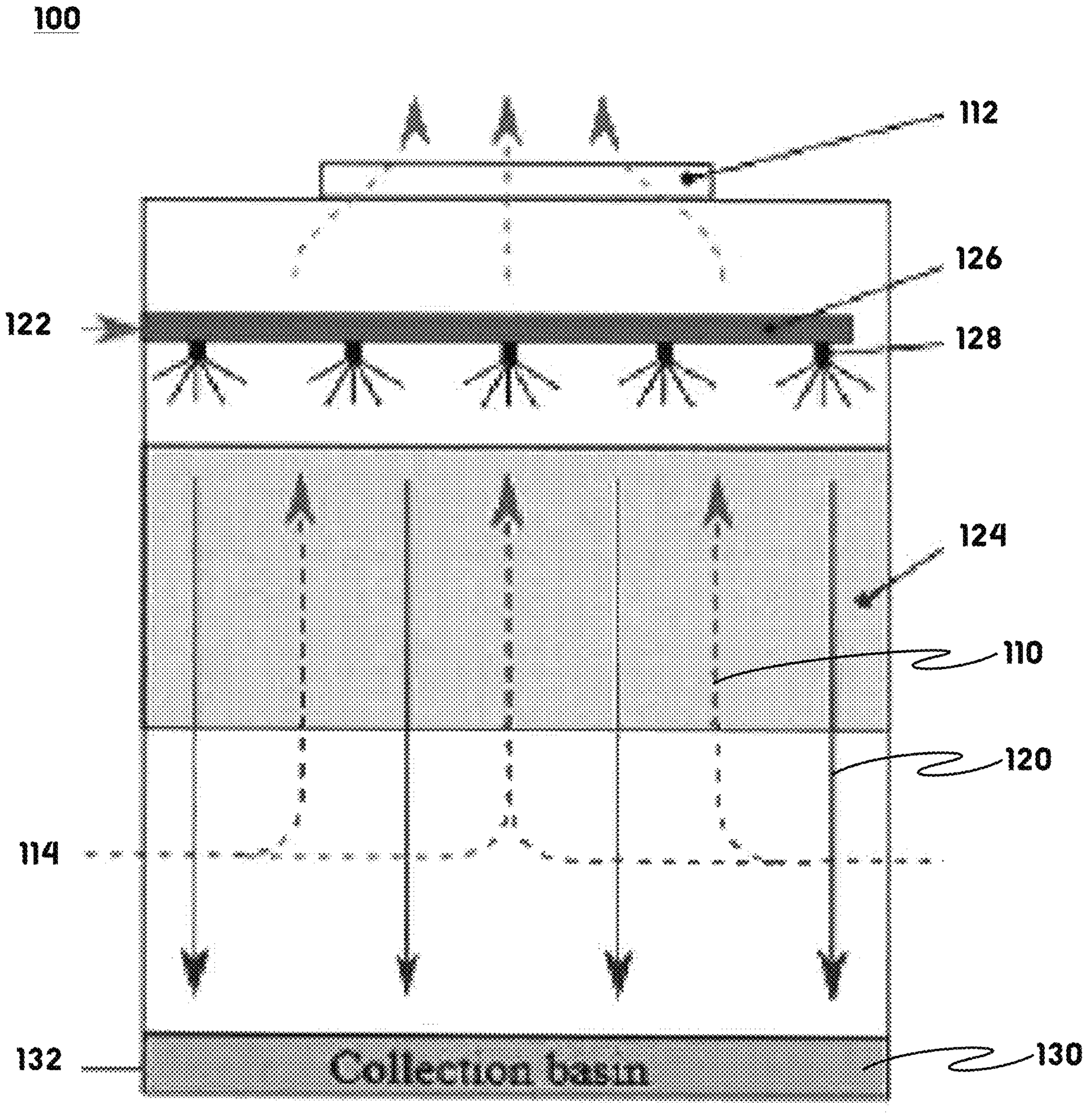
PRIOR ART FIG. 1A
FIG. 1A is a functional diagram of a counter-flow cooling tower.
Figure 1B:
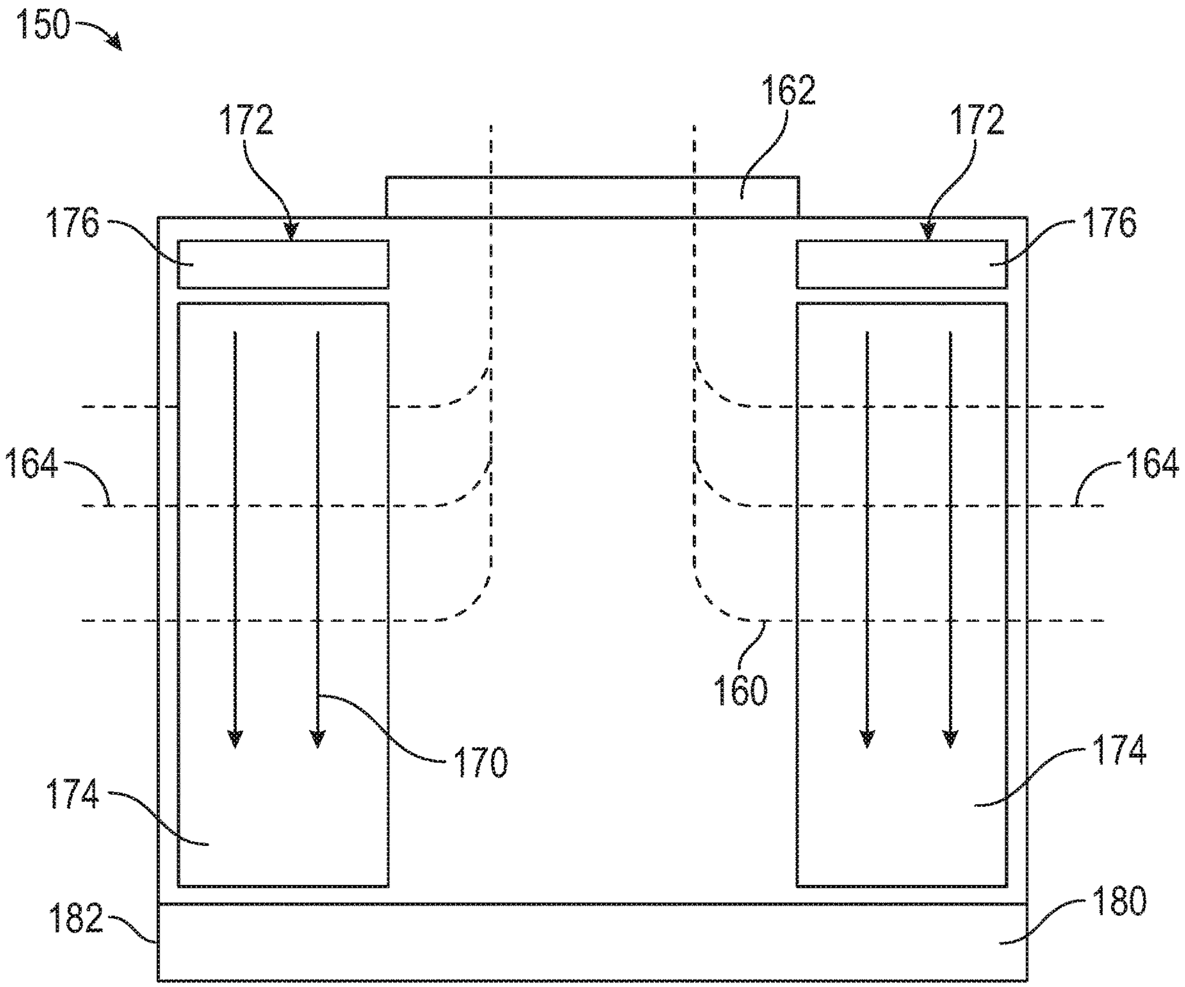
FIG. 1B (Prior Art)
FIG. 1B is a functional diagram of a cross-flow cooling tower.
Figure 2:
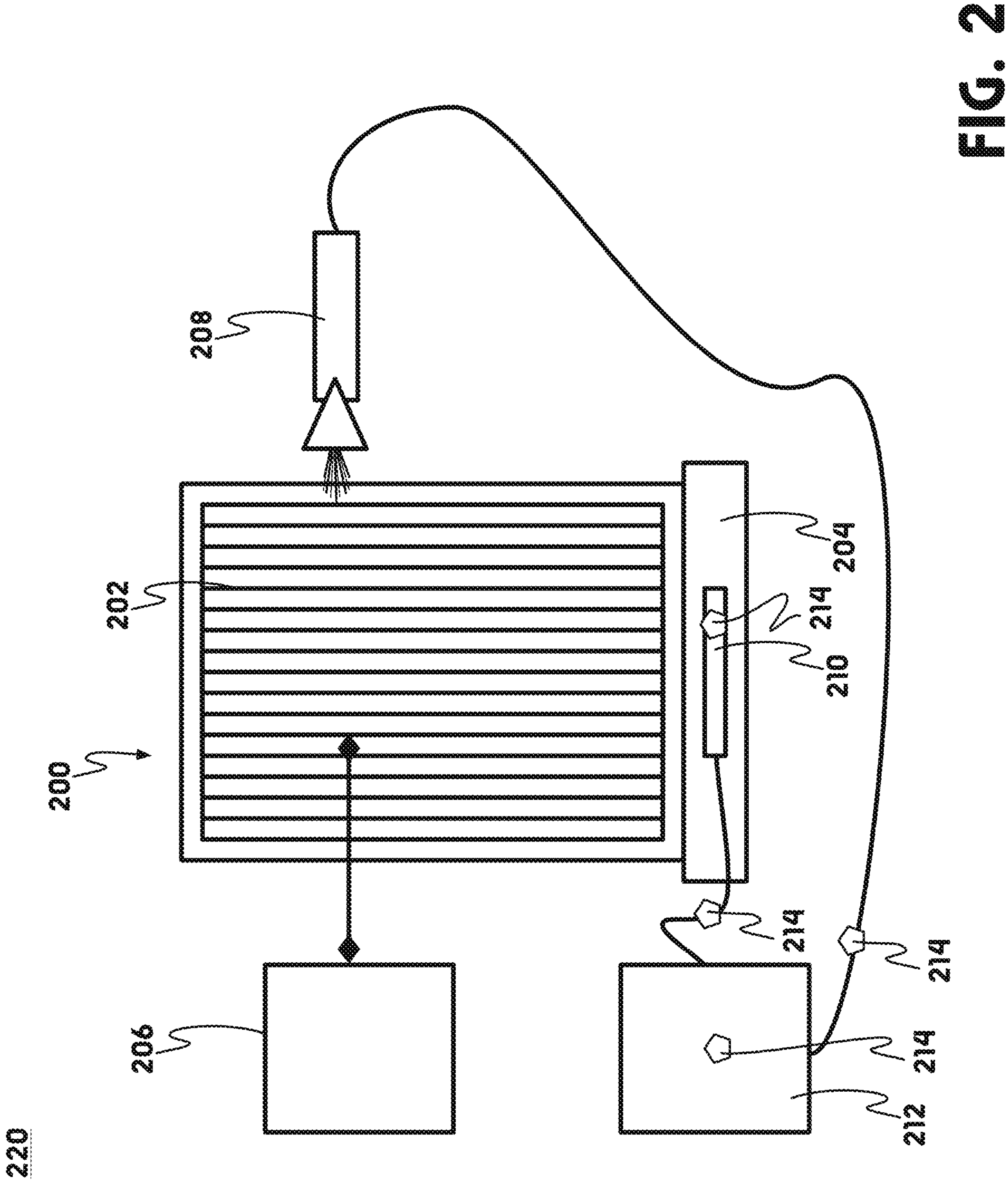
FIG. 2 is a general block diagram illustrating various components of a WTMS.

FIG. 2 is a general block diagram illustrating various components of a WTMS. The WTMS 220 is shown as including a water tower system 200 that includes multiple fill sheets 202 extending vertically from the top of the water tower down to the cool water basin 204. The WTMS 220 basically comprises all of the elements presented in FIG. 2 with the exception of the water tower system 200 itself.

A Hanging Fill Access Tool 206 is illustrated as including an interface to the hanging fill sheets 202. In operation, the hanging fill sheets 202 are side-by-side, often actually connected to maintain their proximity, and as such, it is difficult to clean any debris that may be collecting between the fill sheets. The Hanging Fill Access Tool 206 is configured to create a separation between two adjacent sheets such that the debris can be removed with scrapers or other tools and/or flushed out with water or air pressure. In the illustrated embodiment, a pressure washer system 208 is illustrated as being available to flush debris loose from the facing sides to two fill sheets that have been separated by the Hanging Fill Access Tool 206.

As debris is cleaned from the sides of the fill sheets and/or flushed with the pressure washer 208, the debris follows the water flow through the water tower system 200 such that the water and the debris all land in the cool water basin 204. In the cool water basin 204, a Limited Access Hydro-power Cleaning Tool 210 can be used to extract the debris from the cool water basin 204 so that the debris is not propagated into the water tower system 200, which could cause damage or further impact the efficiency of the cooling system. The Limited Access Hydro-power Cleaning Tool 210 in essence, applies a vacuum or sucking power within the cool water basin 204 to gather up the debris along with water, and then run the dirty water through a Scrubber 212 to remove the debris and/or any gases that may have been introduced from the debris or other sources.

Another aspect of the Water Tower Maintenance System is the use of hydro boosters or accelerators to help facilitate the removal of debris and gases, the breaking up of the debris, and of providing either water pressure for cleaning of the fill sheets and/or extraction of the debris and gases from the cool water basin 204. FIG. 2 illustrates hydro boosters 214 as existing at several locations within the Water Tower Maintenance System 220.

Having described the overall WTMS 220, the various components will now be described in greater detail.

Limited Access Hydro-Power Cleaning Tools

One aspect of the WTMS 220 is the use of hydraulically powered limited access tools that enables or allows for the access (normally) of the area under low hanging cooling tower fill. The fill sheets in a cooling tower generally hang low into the cool water collection basin. A reason for this may simply be to maximize the distance that the water travels during the cooling process. It is common to find that fill within a cooling tower has dropped or is installed with block type supports under the fill that limit access to the area under the fill for proper removal of air wash debris or other deposits that have fallen into the cool water collection basin. If the area beneath low hanging fill is not accessed and cleaned, fouling material residing in the collection basin can create a breeding ground for bacteria as well as to stop the flow of water out of the collection basin and thus resulting in an overflow condition.

Figure 3A:
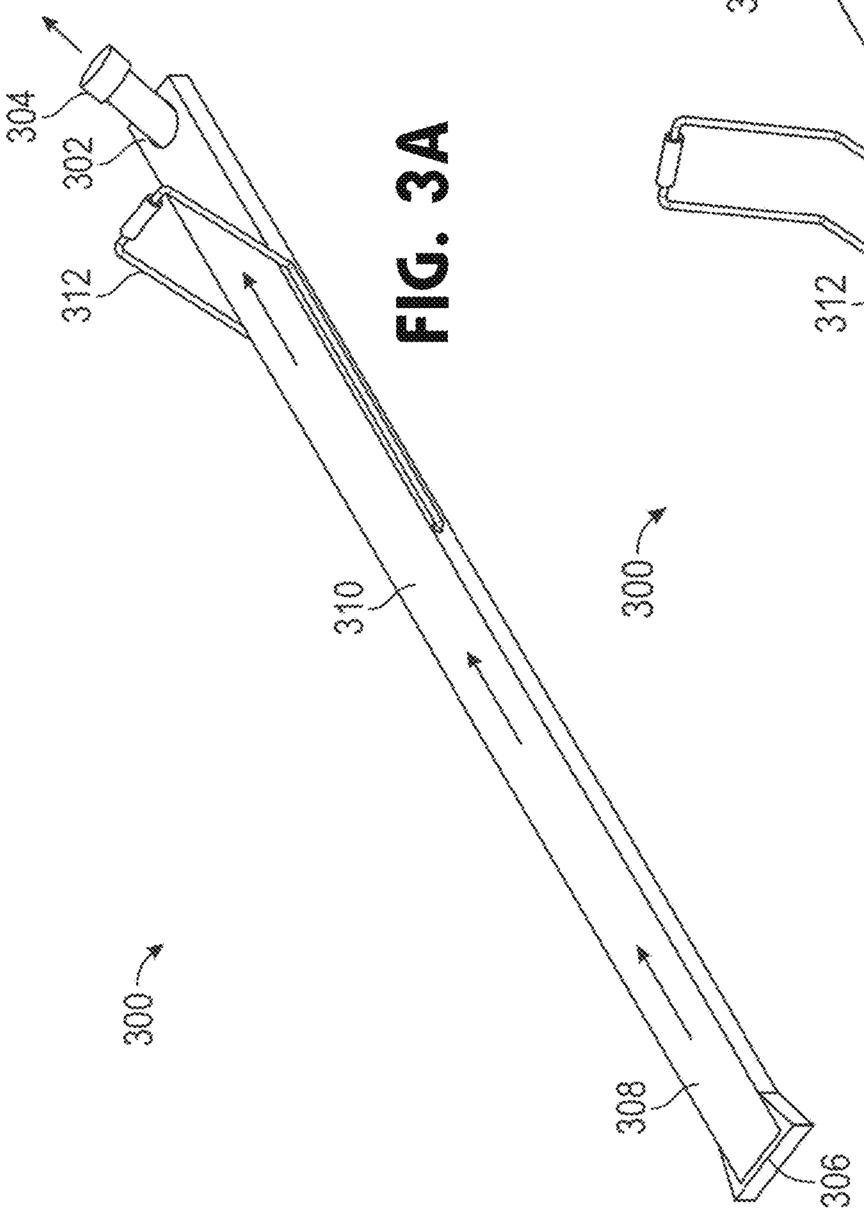
FIG. 3A is a perspective view of an exemplary embodiment of a limited access hydro-power cleaning tool.
Figure 3B:
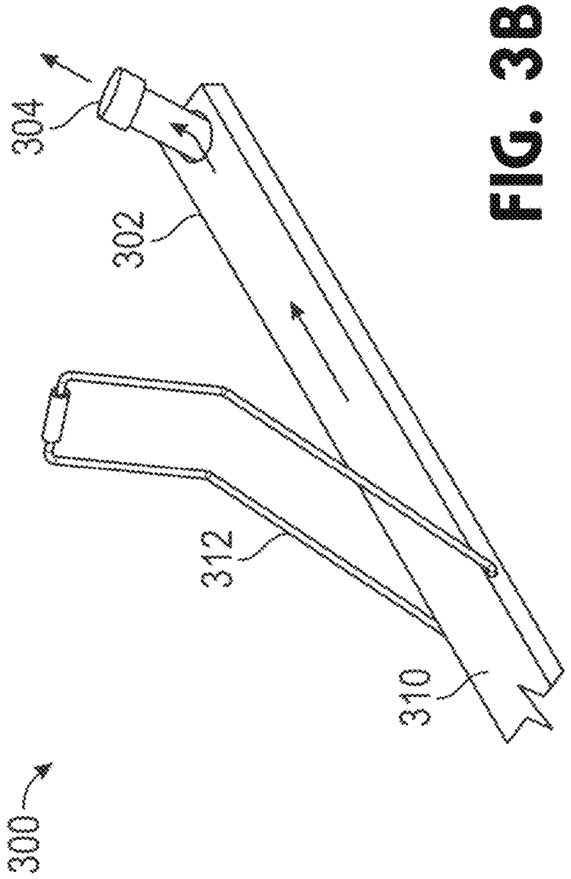
FIG. 3B is a perspective view of an exemplary embodiment of the limited access hydro-power cleaning tool of FIG. 3A with the handle 312 shown in a raised position.

FIG. 3A is a perspective view of an exemplary embodiment of a limited access hydro-power cleaning tool. The hydro-power cleaning tool 300 (herein after referred to as "the tool 300") includes a tool body 310 that includes a proximate end 302 with a nozzle 304 protruding therefrom at an angle relative to the surface of the top of the tool 300, such as 45 degrees as a non-limiting example. The distal end 306 of the tool body 310 is illustrated as including a flared mouth opening 308. The flared mouth opening 308 is used, similar to the end of a vacuum hose, to extract debris, gas and fluid from the cool water collection basin. The tool body 310 of the tool 300 extending from the proximate end 302 to the distal end 306 is generally hollow but in some embodiments, may be solid with hollow tubes or pipes running through the tool body 310, above or below the tool body 310, or to the side of the tool body 310. Regardless of the configuration, the tool 300 generally includes a fluid path extending from the opening 308 to the nozzle 304. The tool 300 also includes a handle 312 that can be used to maneuver the tool 300 into various locations under the hanging fill sheets. The handle can pivot to a lowered position as shown in FIG. 3A. FIG. 3B is a perspective view of an exemplary embodiment of the limited access hydro-power cleaning tool of FIG. 3A with the handle 312 shown in a raised position. Thus, the embodiments of the tool 300 may include such as handle 312 that is angled upward towards the operator such that the handle 312 pivots in the center of the tool 300 to allow for comfortable handling of the tool 300 when inserting or withdrawing from under fill area.

Exemplary and preferred embodiments of tool 300 enable access to the area below the fill or fill supports if there is a clearance from the bottom of collection basin to the underside of fill of preferably 1 inch but, embodiments of the tool 300 can be made to functionally operate with a clearance as low as ⅝$^{th}$ of an inch.

Moreover, preferred embodiments of the tool 300 have a wide opening of approximately 4 inches at the flared opening 308 to allow for efficient debris removal while also stabilizing the tool 300 while in use. In addition, in preferred embodiments suction may be enhanced by utilizing one or more inverted nozzles that can be incorporated into the tool 300 and directed to generate a high-pressure water flow in an upstream direction that complements the suction flow upward to an attached hose located at the rear of the tool at a 45-degree angle (more or less). The inverted nozzles can be implemented in a variety of techniques.

Figure 3C:
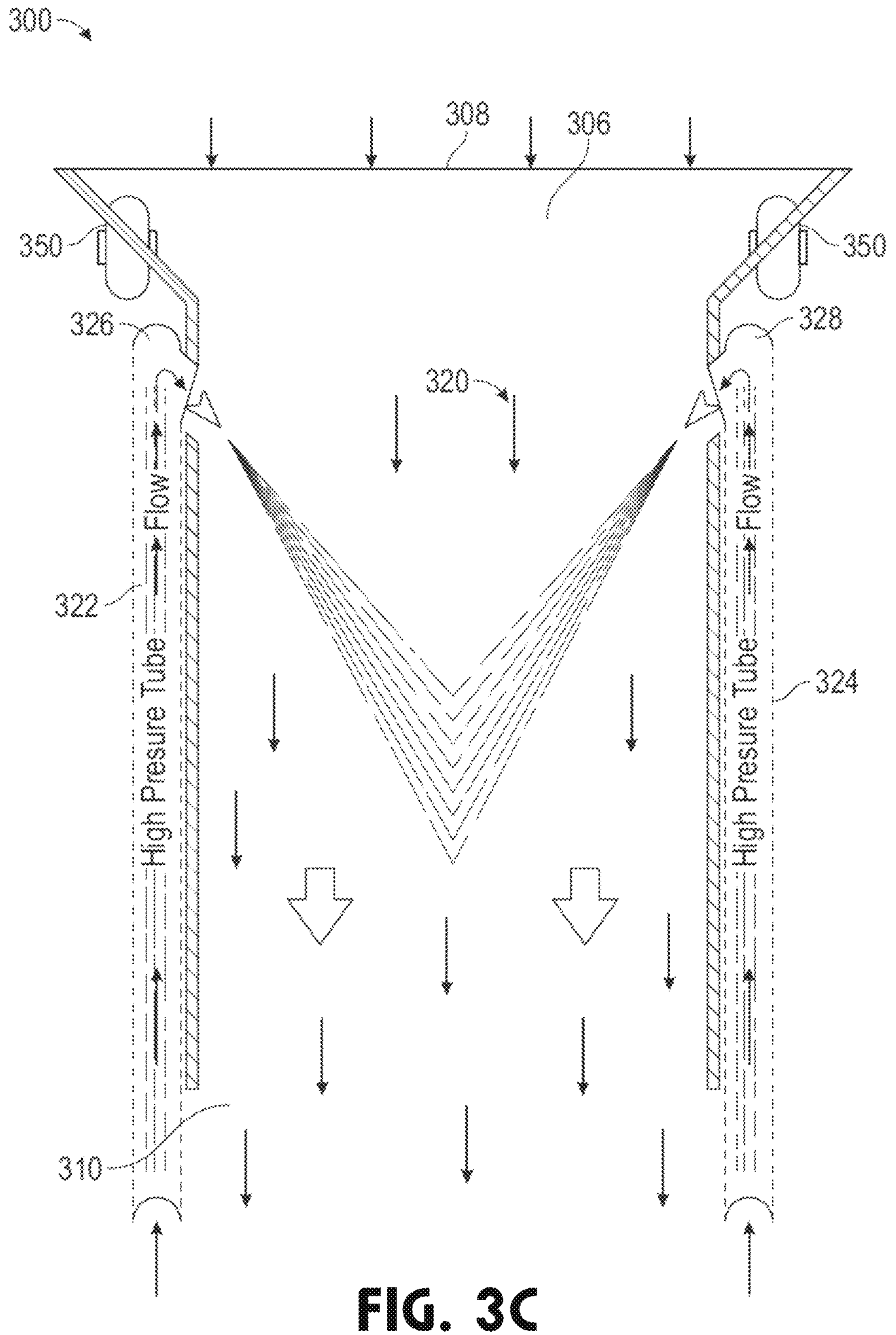
FIG. 3C is a plan diagram illustrating one configuration of utilizing inverted nozzles in an embodiment of the tool 300.

FIG. 3C is a plan diagram illustrating one configuration of utilizing inverted nozzles in an embodiment of the tool 300. In the illustrated embodiment, the flared mouth opening 308 shows a fluid flow direction 320 that is directed from the distal end 306 towards the proximate end 302 and the nozzle 304. High pressure tubes 322 and 324 extend laterally with the tool body 310 and then near the distal end 306, the high-pressure tubes 322 and 324 include a sharp bend and terminate with inverted nozzles 326 and 328 respectively. The end of the inverted nozzles 326 and 328 are inserted into the hollow interior of the tool body 310 through an aperture in the wall of the tool body 310. The inverted nozzles 326 and 328 are oriented at about a 45-degree angle or less relative to the direction of the water flow 320. As such, the water shooting out of the high-pressure tubes 322 and 324 helps to create a vacuum or negative pressure to facilitate or encourage the suction of debris within the cool water collection basin through the interior of the tool body 310. The inverted nozzles assist in generating flow momentum thereby, drawing fine mud and other debris into the mouth of the tool at a relatively greater force. Advantageously, agitation of sediments by the tool 300 movement is reduced, thereby mitigating contamination of surrounding water in favor of drawing sediments into suction area of tool.

Figure 3D:
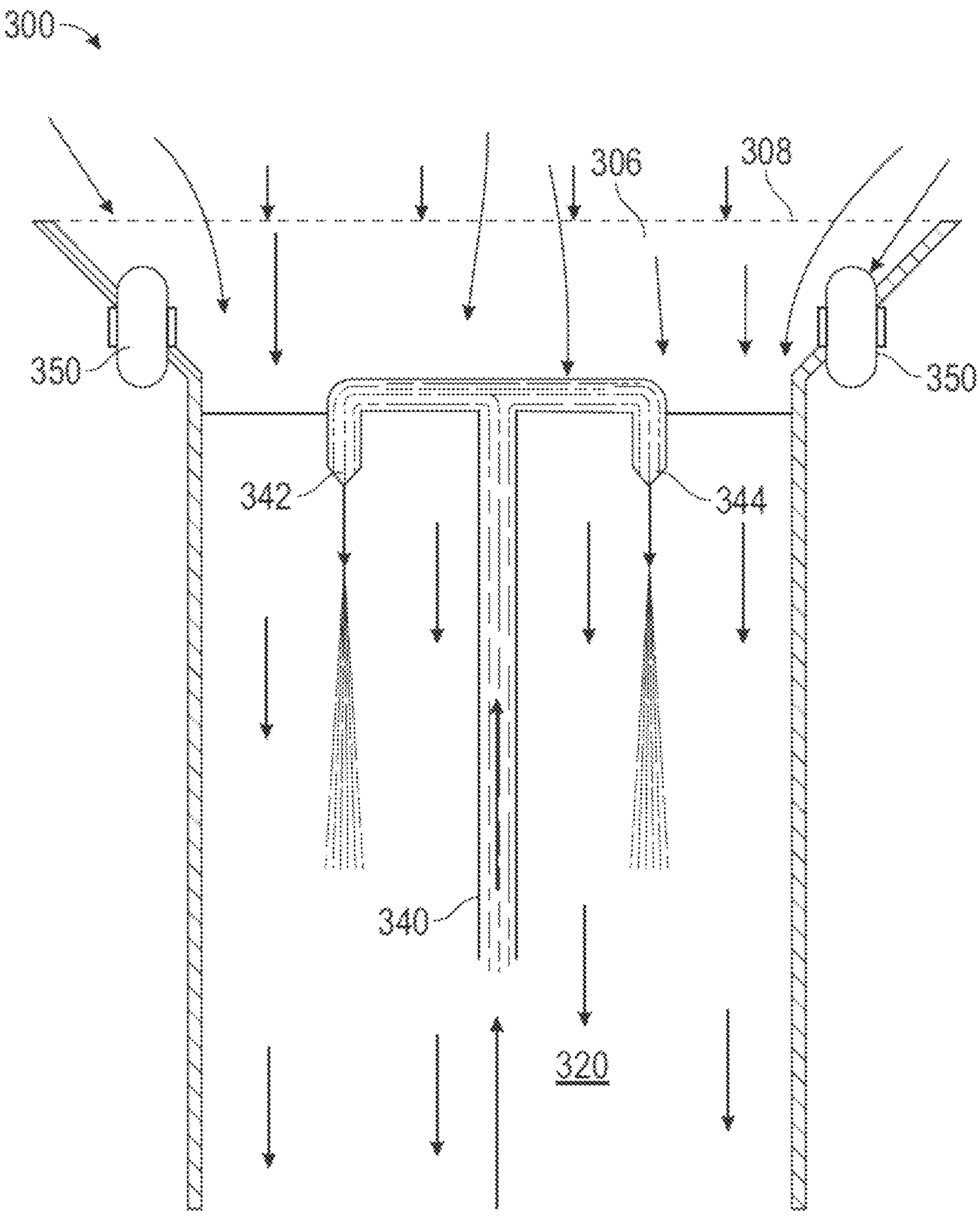
FIG. 3D is a plan diagram illustrating another configuration of utilizing inverted nozzles in an embodiment of the tool 300.

FIG. 3D is a plan diagram illustrating another configuration of utilizing inverted nozzles in an embodiment of the tool 300. In the illustrated embodiment, the flared mouth opening 308 shows a fluid flow direction 320 that is directed from the distal end 306 towards the proximate end 302 and the nozzle 304. High-pressure tube 340 extends laterally within the interior of the tool body 310 and then near the distal end 306, the high-pressure tube 340 is illustrated as terminating in a T-shape extending towards the side walls of the tool body 310. At approximately a mid-point between high-pressure tube 340 and the side wall of the tool body 310, the end of the T-shape is bent at about a 90-degree angle and pointed in the direction of the water flow 320. An inverted nozzles 342 and 344 are placed on each end of the T-shape such that the opening of the inverted nozzles 342 and 344 face the direction of the water flow 320. As such, the water shooting out of the high-pressure tube 340 is then forced out of the inverted nozzles 342 and 344 which helps to create a vacuum or negative pressure to facilitate or encourage the suction of debris within the cool water collection basin through the interior of the tool body 310. The inverted nozzles 342 and 344 assist in generating flow momentum thereby, drawing fine mud and other debris into the mouth of the tool at a relatively greater force. Advantageously, agitation of sediments by the tool 300 movement is reduced, thereby mitigating contamination of surrounding water in favor of drawing sediments into suction area of tool.

Additionally, embodiments of the tool 300 may include a pair of rollers or wheels 350 located on either side of the flared mouth opening 308 to assist in moving and positioning of the tool 300 under the fill area and keeping the tool from damaging the basin of the cooling tower.

Figure 3E:
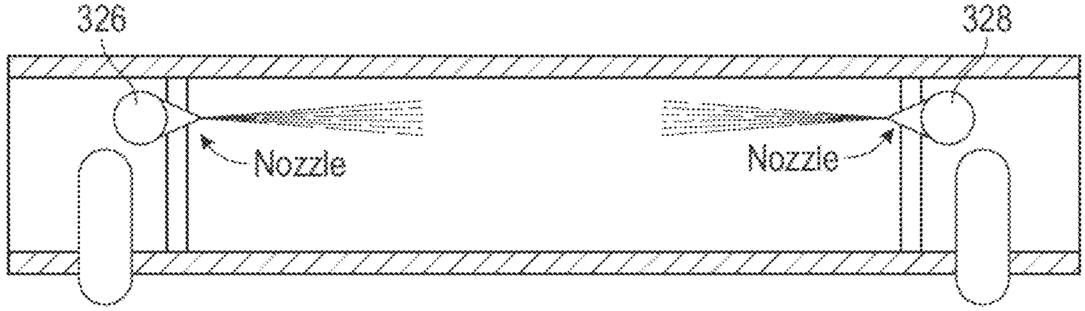
FIG. 3E is a cross-sectional view of the inverse nozzle configuration of FIG. 3C.
Figure 3F:
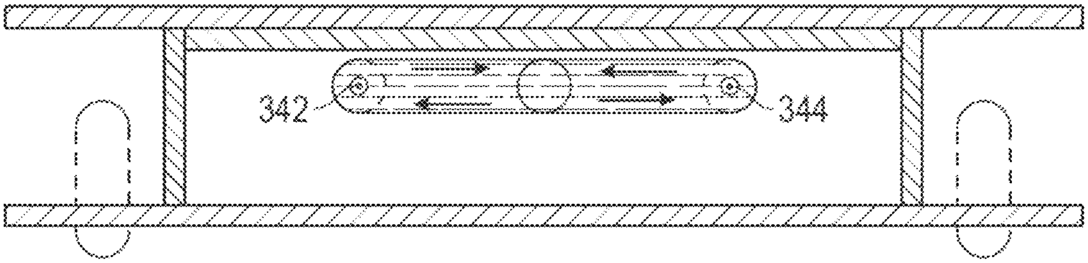
FIG. 3F is a cross-sectional view of the inverse nozzle configuration of FIG. 3D.

FIG. 3E is a cross-sectional view of the inverse nozzle configuration of FIG. 3C. FIG. 3F is a cross-sectional view of the inverse nozzle configuration of FIG. 3D.

Returning to the high-pressure flow assist inverse nozzles, embodiments of the tool 300 may incorporate one or more high-pressure hoses with quick attachment connectors in the same area as the main suction hose connector 304. The high-pressure hoses may be converted in size down to a high-pressure tubing configured to run down each side of the tool 300 such that the overall profile of the tool stays within a maximum height and permits clearance for the under fill area targeted for cleaning. It is envisioned that tubing can be installed on the tool body via welding on either side of the tool body 310 exterior, or within the tool body 310, running from the handle area down to the mouth opening 308 along the inside top wall location of the tool 300. At the mouth opening 308, it is envisioned that the inverse nozzles may be installed facing rearward or upstream.

Hanging Fill Access Tool

The hanging fill access tool 206 as described in connection with FIG. 2 is utilized to gain access to the area between hanging fill sheets. The various embodiments and configurations of hanging fill access tools provide for a way to access interior spaces of hanging fill in a cooling tower to remove scale and fouling. A great advantage of this aspect of the invention is that it enables a user to access the interior faces of a hanging fill sheet for cleaning without having to take the cooling tower offline. With the interior spaces safely accessible, debris can be removed by pressure washing and/or other means. Embodiments of the hanging fill access tool 206 allow a user to safely open and access the facing surfaces between any two fill sheets, thereby allowing the cleaning and removal of debris, including heavy scale development, that blocks proper air flow and water flow, which diminish total cooling tower equipment overall efficiency, performance, and life span.

Embodiments of a hanging fill access tool 206 are designed to work together to ensure complete access from top (near hot water basin) to bottom (near cold water basin) of interior spaces of the hanging fill without risk of damage to the fill. Advantageously, when installed, the bodies of the tools are designed to accommodate falling debris without impeding the debris from reaching the cold water basin where it can be easily removed.

Figure 4A:
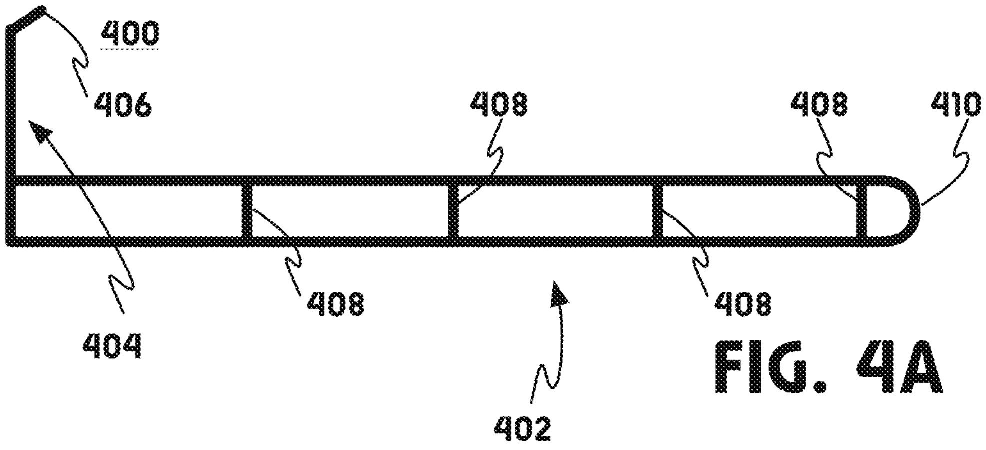
FIG. 4A is a plan view of a conceptual diagram of an embodiment of the hanging fill access tool.
Figure 4B:
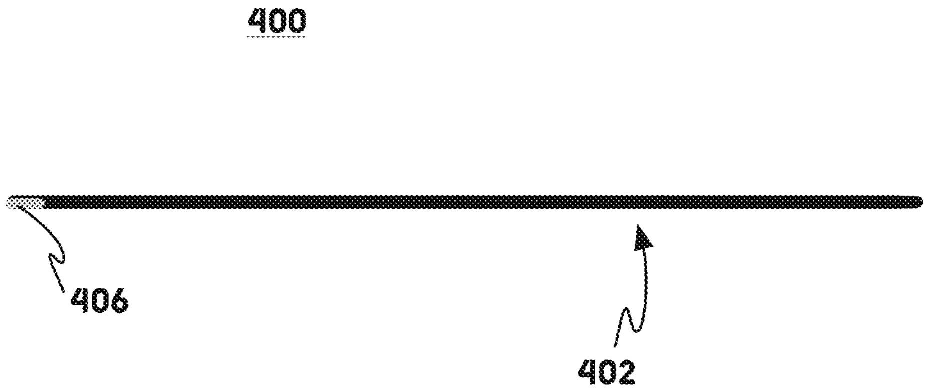
FIG. 4B is a side elevation view of the conceptual diagram of the embodiment of the hanging fill access tool of FIG. 4A.

FIG. 4A is a plan view of a conceptual diagram of an embodiment of the hanging fill access tool. FIG. 4B is a side elevation view of the conceptual diagram of the embodiment of the hanging fill access tool of FIG. 4A. The tool 400 includes an elongated arm 402 and a handle 404. The elongated arm 402 is flat and wide in the view of FIG. 4A but when it is turned 90-degrees, it can be seen that the side view is very narrow compared to the top view. The elongated arm 402 consists of a rods or tubes that run parallel to each other for the length of the elongated arm, and then are joined together at a distal in with a curved rod or tube, and at a proximate end with another rod or tube. It can be appreciated that the elongated arm 402 may be one continuous rod or tube that is bent into the desired shape or multiple pieces that are welded or other connected together. In some embodiments the elongated arm may be cast in a mold or otherwise constructed.

A handle 404 is located at the proximate end of the elongated arm 402, the proximate end being the end that an operate holds. The handle extends from the elongated arm 402 at approximately a 90-degree angle and on the same plane as the elongated arm 402 as best seen in FIG. 4A. It should be noted that the angle does not need to be exactly 90-degrees and different embodiments may differ. The handle also includes and bend or anchor 406 at the end extending away from the elongated arm 402 and the anchor 406 is angled in the direction of the elongated arm 402 but slightly flared out in the illustrated embodiment. In some embodiments the anchor may be parallel to the elongated arm 402 and the length of the anchor may vary. The distal end of the elongated arm 410 is rounded to facilitate entry of the elongated arm between the fill sheets. The curved end 410 reduces the risk of snagging or puncturing the fill sheet and increases the ability for the elongated arm 402 to inter between the fill sheets as described in greater detail below. To provide structural integrity, cross beam members 408 can be used to extend between opposing rails of the elongated arm 402. For example, see rounded railings of the exemplary tool body illustrated in FIG. 3A. The length and width of the elongated arm 402 can vary depending on the particular construction of the fill for a particular water tower. In some embodiments, the elongated arm 402 may telescope inwardly or outwardly to change the length of the elongated arm. Further, in some embodiments the width of the elongated arm 402 may also telescope to create a wider or narrower opening between the fill sheets.

Figure 4C:
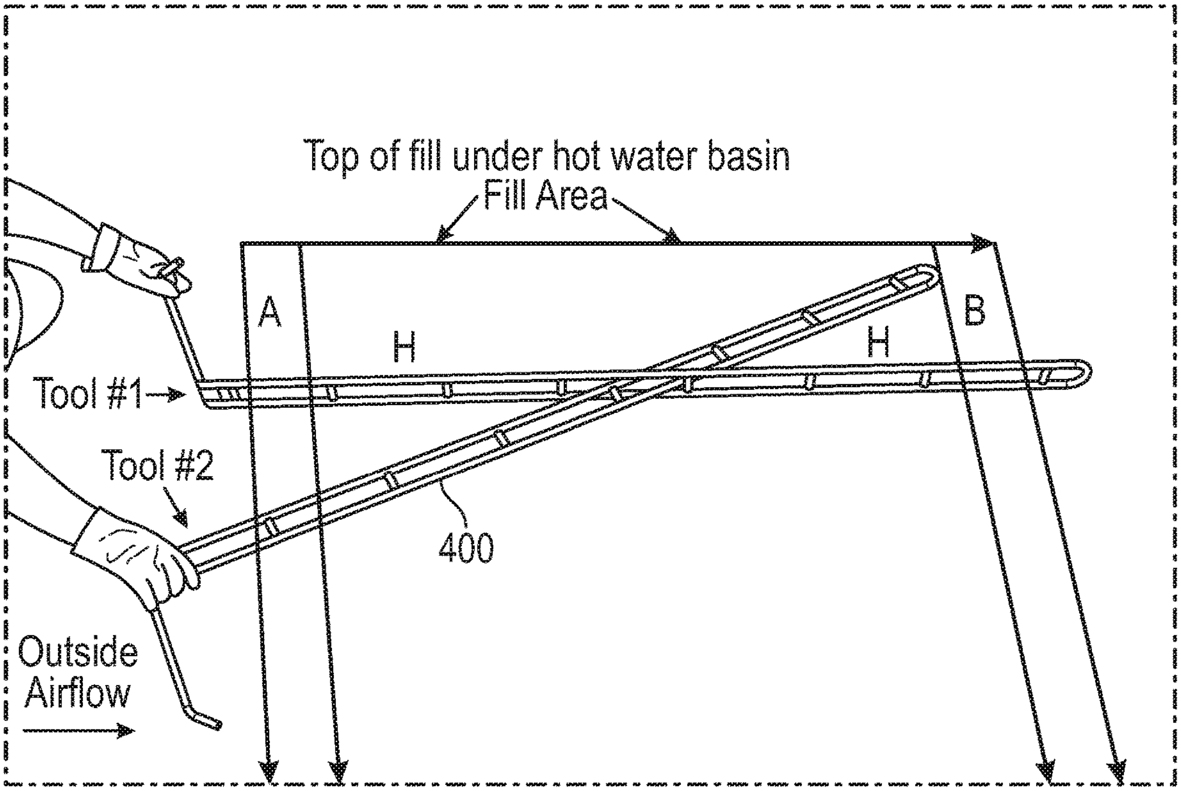
FIG. 4C is a photograph of an actual hanging fill access tool provided for purposes of illustration.

FIG. 4C is a photograph of an actual hanging fill access tool provided for purposes of illustration.

Figure 4D:
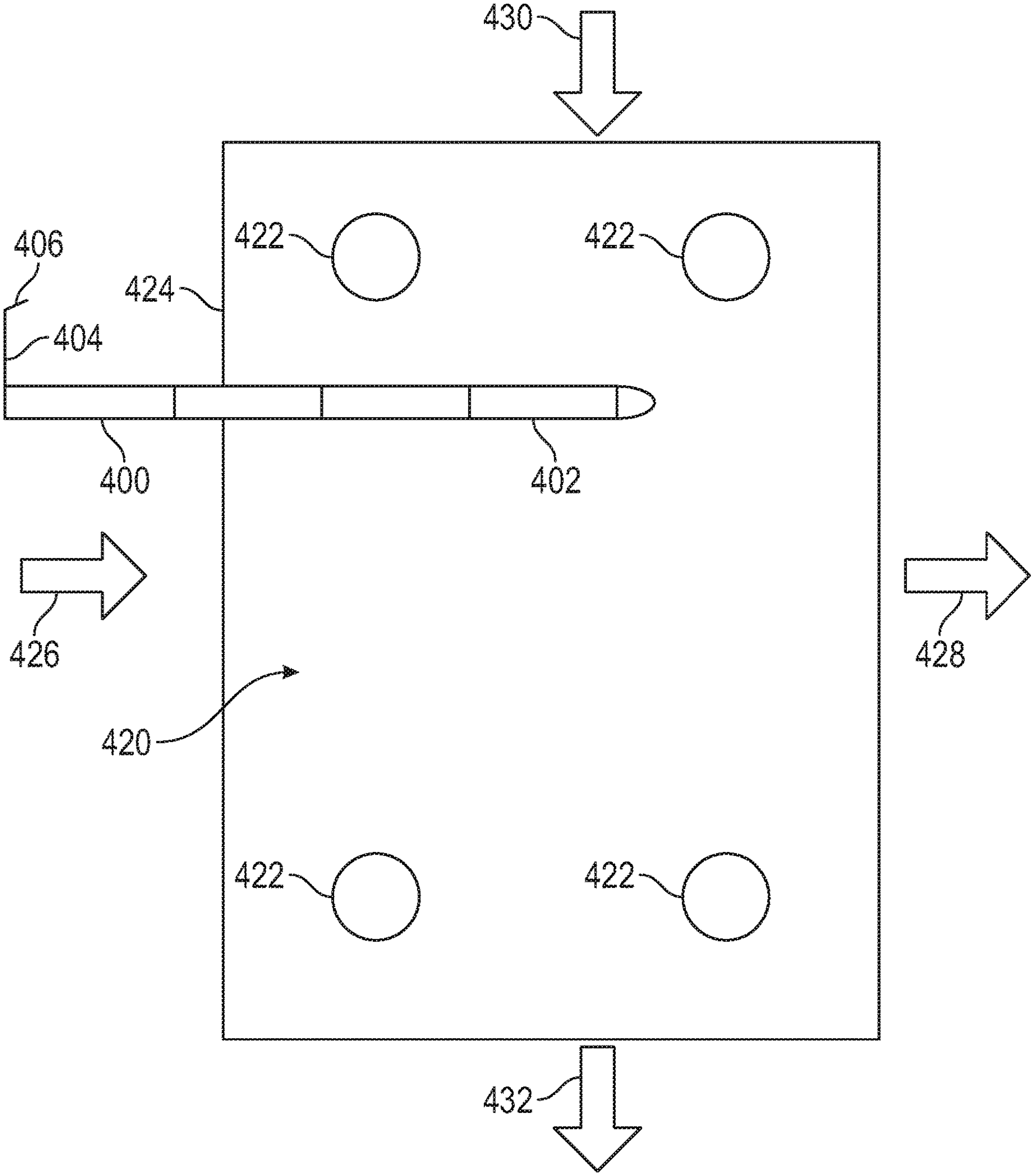
FIG. 4D is a cross-sectional view and conceptual diagram of the operation of the hanging fill access tool.

FIG. 4D is a cross-sectional view and conceptual diagram of the operation of the hanging fill access tool. A surface 420 of fill sheet 424 is presented, although in actual operation this view would be shrouded by the fill sheets in front of the exposed fill sheet 424. A hanging fill access tool 400 is shown as having been inserted between the shown fill sheet 424 and the adjacent fill sheet in front of fill sheet 424 (not illustrated). Adjacent fill sheets are connected to each other and/or held in place by means of one or more fill supports 422.

Arrow 426 illustrates the air input louver side of fill sheet 424 and arrow 428 illustrates the eliminator or fan side of fill sheet 424, and this the air flow is in the direction of arrows 426 and 428. Arrow 430 illustrates the hot water input area and arrow 432 illustrates where the water exits the fill and enters the cool water basin.

In operation, the hanging fill access tool 400 is gently slid between fill sheets until the handle 404 is close to the fill sheets, such as 2-5 inches away plus or minus as a non-limiting example. The operator then rotates the handle 404 either left or right until it moves from a vertical orientation to a horizontal orientation. At this point, the elongated arm 402 also rotates and thus separates the fill sheet 424 from the fill sheet that is immediately in front of fill sheet 424. The elongated arm 402 can then be further inserted the rest of the way and can then be locked in place with lower handle bend lock or anchor being slid into fill sheets on either side. The railing design of the elongated arm 402 allows for rotation of the tool without binding on normally installed PVC sheets. As such the railings or tubes of the elongated arm 402 may be rounded and smooth and may even be coated with a special material such as TEFLON etc.

The closed position of the tool is when handle is vertical so that it can be inserted into the vertical-hanging fill. In this position the hanging fill access tool has less drag or resistance when being inserted between the fill sheets and can be worked up or down to position tool. This is the best position to open and clear heavily loaded fill. By moving the tool carefully into and out of the fill in a sawing motion, scale, fibers and such will become trapped between the tool supports and be discharged on both sides of the fill sheet. When a sufficient amount of buildup has been removed (normally between four of five sheets) and the fill sheet has room to flex to the side. The fill sheet is now ready to be opened working between each sheet and away from the clean area towards the reset of the tower's fill in need of service.

Figure 4E:
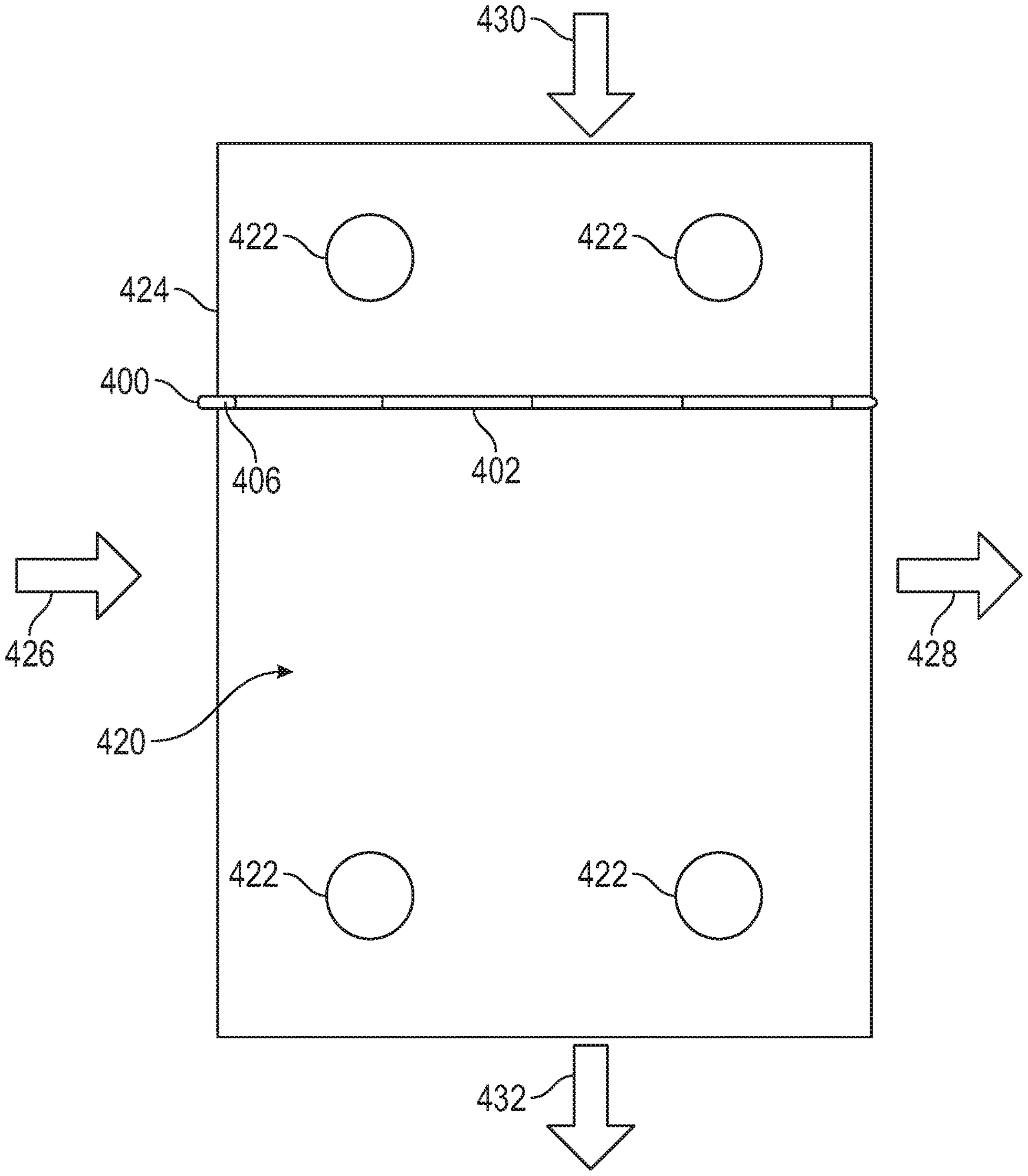
FIG. 4E Is a cross-sectional view and conceptual diagram of the operation of the hanging fill access tool that has been fully inserted between fill sheets and locked into position.

FIG. 4E Is a cross-sectional view and conceptual diagram of the operation of the hanging fill access tool that has been fully inserted between fill sheets and locked into position. The elongated arm 402 has been rotated such that the wider portion of the elongated arm 402 is forcing the adjacent fill sheets apart and the anchor 406 has been inserted between other fill sheets to hold the hanging fill access tool 400 in position.

Additional hanging fill access tools 400 can then be inserted similar to the first hanging fill access tool 400 either above or below. In operation, spacing the hanging fill access tools 400 approximately 24 inches apart has been shown to be useful, although more or fewer than 24 inches may be used for the spacing. Once each hanging fill access tool 400 is inserted, it can be rotated between a closed position and open by rotating the handles left or right horizontally across fill sheets, where rotating the handle to a horizontal position opens the gap between the fill sheets. Once several of the hanging fill access tools have been inserted, a large working area between two adjacent fill sheets are exposed. Depending on the structure of the fill sheets and the fill supports, it may be difficult to clean above or below the fill supports. To access between and/or above or below fill sheet supports, a user can insert a hanging fill access tool 400 into the open area of the fill and move it up and down through the gaps in the elongated arm 402 of the hanging fill access tool most proximate to the fill supports 422.

By repeating the same procedure with the rest of the tools and placing one under the other (approximately 24 inches apart) access can be maximized between a given working area of fill. It should be noted that in some embodiments used on crossflow towers, a tool can simply be inserted above and below fill supports. On towers with outer air inlet louvers (metal or the like) the above can be accessed through the eliminator side of the fill.

Figure 4F:
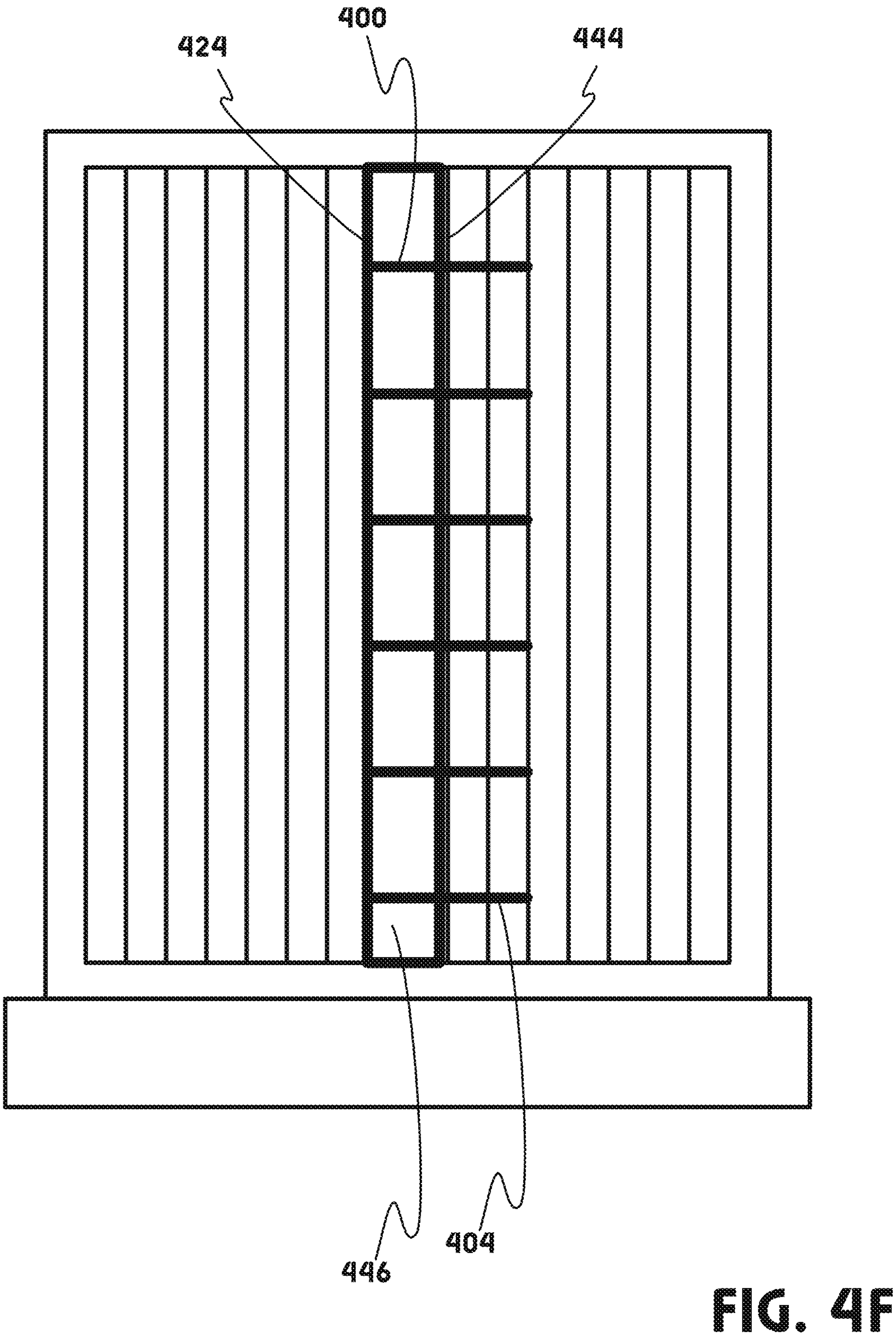
FIG. 4F is a conceptual view of a fill that has multiple hanging fill access tools 400 inserted between fill sheet 424 and fill sheet 444.
Figure 4G:
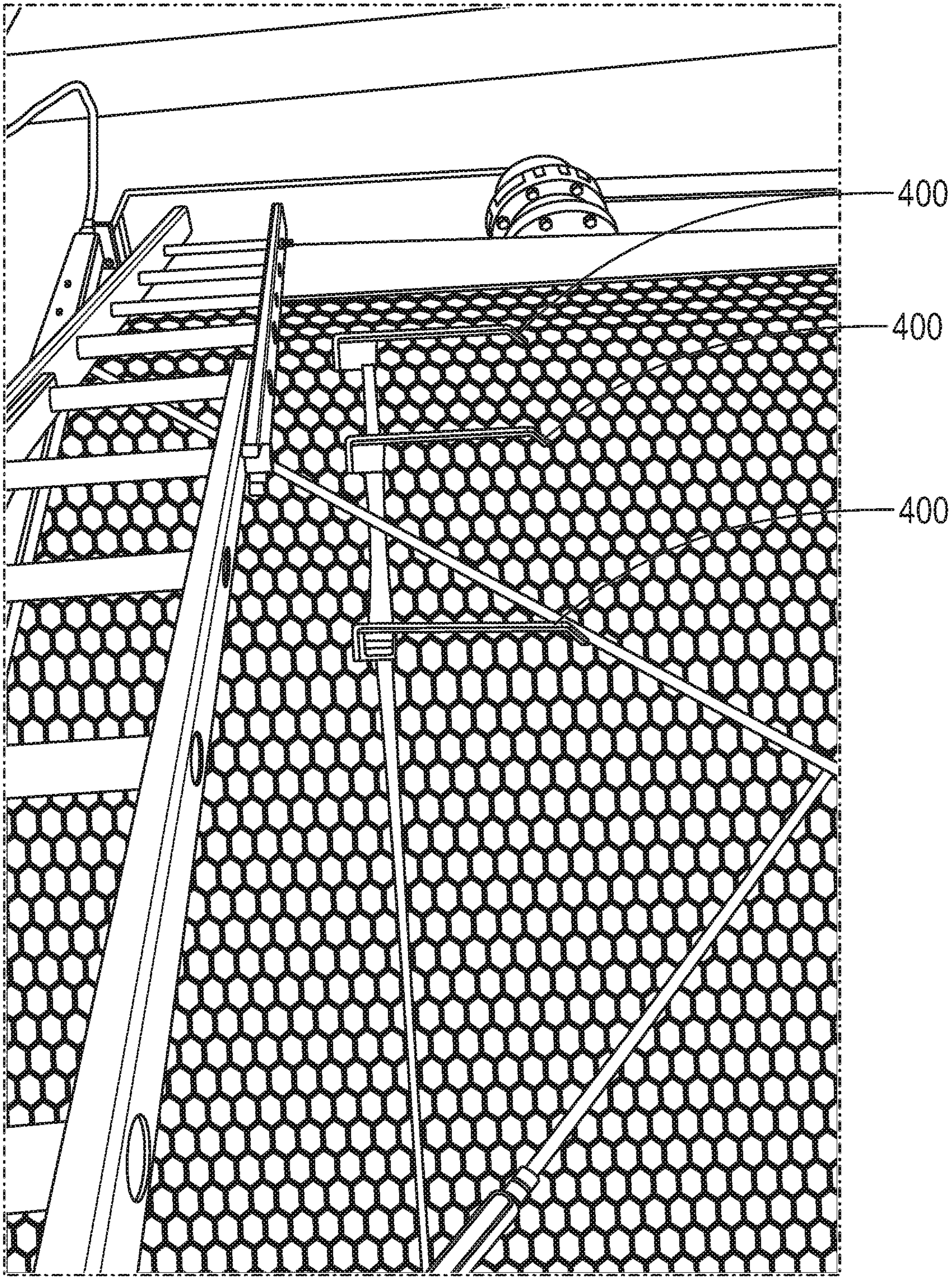
FIG. 4G is a photograph of an actual fill with three hanging fill access tools 400 inserted between two adjacent fill sheets.

FIG. 4F is a conceptual view of a fill that has multiple hanging fill access tools 400 inserted between fill sheet 424 and fill sheet 444. The handles have been rotated to the right and locked into position and a gab 446 has been created such that a user can now use high-pressure water or other means to clean out debris, scale, settlement, etc. from the surface of the fill sheets. FIG. 4G is a photograph of an actual fill with three hanging fill access tools 400 inserted between two adjacent fill sheets.

System for Gas and Debris Removal from Cooling Towers

Another aspect of various embodiments of the WTMS includes a system for gas and debris removal from the cooling towers. Exemplary embodiments may employ mechanical devices to create a negative pressure within a vessel to draw fluid into the vessel and provide for extraction of gases entrained in the fluid. The gases may be introduced into the system via leaks in system components (such as at fittings or connectors) or may be the result of bacterial waste and/or organic decomposition in the silt/mud layer being cleaned/vacuumed from the cooling tower system basin. The volume of material that is attributable to the extracted gas is replenished with makeup water. In this way, the system provides for continuous operation of a suction-based cleaning system without risk of air lock or pump cavitation.

It is envisioned that embodiments of the system may employ strategically placed high pressure injection components to enhance mechanical movement of fluid and debris out of below grade sumps toward a discharge location for disposal. Advantageously, embodiments of the solution may be expandable to fine tune proper flow rates so as to not remove excessive fluid volume but rather, only the required volume to achieve debris removal based on density.

Embodiments of the system may be configured such that they are not easily damaged by abrupt clogging from debris. Further, embodiments of the system may employ hydraulic fluid accelerator devices that are placed in series to encourage proper flow through a long hose that runs on either vacuum pressure intake or discharge that can be adjusted to control flow. Moreover, some embodiments may employ a Venturi effect like configuration by using a smaller diameter inlet (normally) hosing on vacuum or negative pressure side to higher diameter hosing to accelerate a flow rate on suction while lowering the flow rate on discharge to allow for concentration of accumulation for disposal processing.

Embodiments of the system may be modular to allow for customization in the field and case of assembly, such as insertion or removal of accelerator devices. That is, embodiments of a system according to the solution may allow for the placement of hydro-booster components.

Figure 5A:
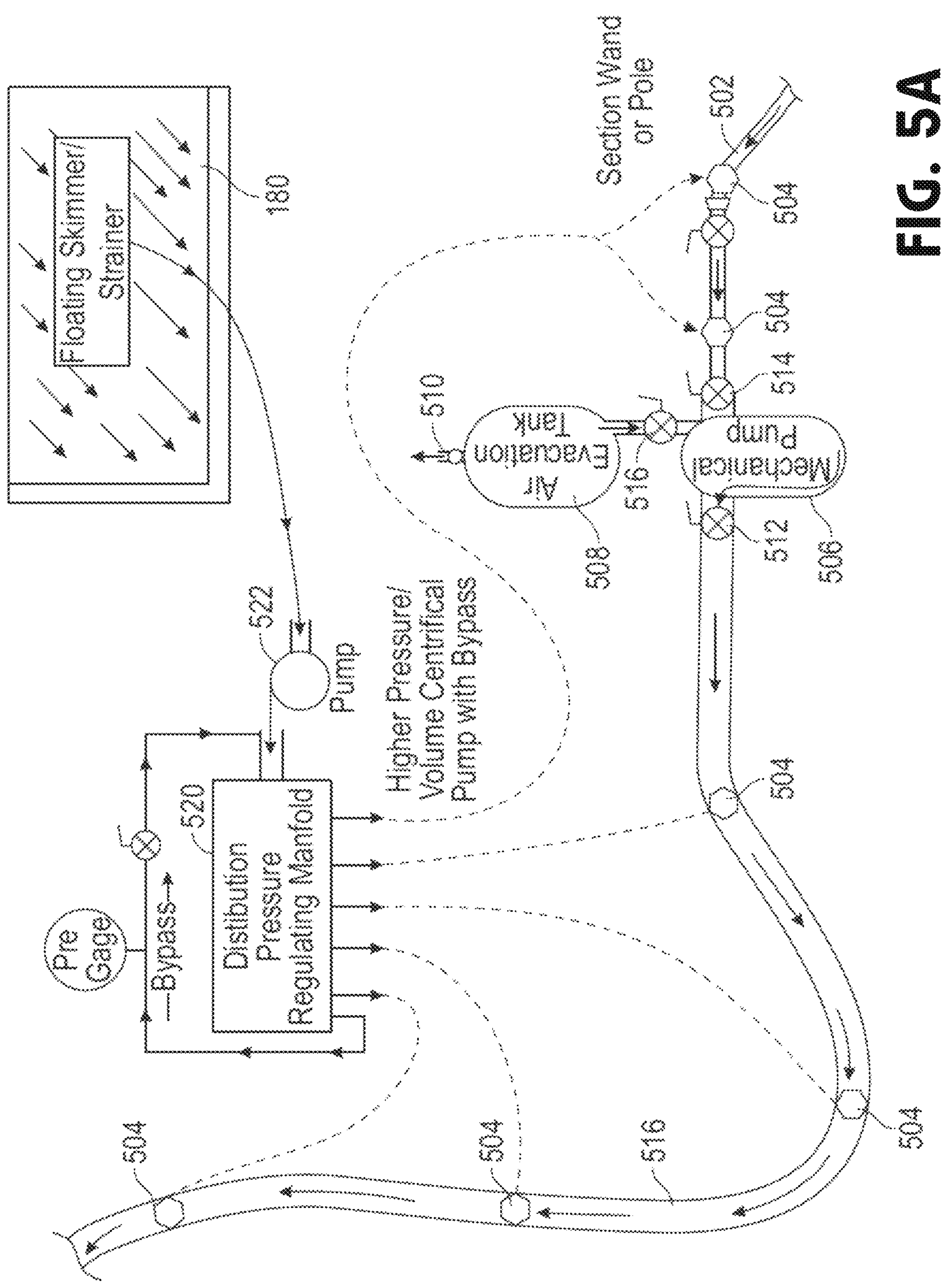
FIG. 5A is a system diagram illustrating the components, connectivity and operation of an exemplary embodiment of the gas and debris removal system.

FIG. 5A is a system diagram illustrating the components, connectivity and operation of an exemplary embodiment of the gas and debris removal system. As can be understood from the illustration of FIG. 5A, the exemplary system for gas and debris removal from cooling towers entails a vacuum (not shown) that removes debris laden water from a cooling tower, such as at its chilled water basin (not shown in FIG. 5A) using an instrument such as a wand or pole 502 that may be attached to a limited access hydro-power cleaning tools such as that described in FIG. 3A. The "dirty" water enters the system as depicted in the FIG. 5A illustration at the bottom right of the illustration labeled using the wand or pole and cleaning tools 502. Hydro-booster components 504 provide additional motive force to encourage the flow into a mechanical pump vessel 506 at inlet 514. Advantageously, entrained gases rise in mechanical pump vessel 506 and collect in an air evacuation tank 508. The collected gases may be exhausted out the top of the air evacuation tank 508 through a check valve 510 or other valve mechanism. Makeup water is introduced into the air evacuation tank 508 to replace the volume attributable to the exhausted collected gases. Sight glasses mounted to the air evacuation tank 508 and mechanical pump vessel 506 may provide user feedback as to the fluid/gas levels in each, as would be understood by one of ordinary skill in the art of sight glass technology.

As shown in the exemplary embodiment illustrated in FIG. 5A, hydro-booster components 504 may be employed at both the inlet and outlet of the mechanical pump vessel 506 to overcome longer runs or heavy debris laden removal water, thereby enhancing flow performance throughout the complete system. A more detailed description of the various embodiments of the novel hydro-booster components is outlined below.

Fluid exiting the mechanical pump vessel 506 at outlet 512 is urged down an effluent hose 516 to a discharge point (not illustrated) by strategic placement of hydro-booster components 504 along the hose 516. The hydro-booster components 504 introduce the motive force into the hose(s) with a high-pressure fluid flow generated by a distribution pressure regulating manifold 520 (the "manifold 520"). The manifold 520 is supplied water from a water source (e.g., the cold water basin 180) and pump 522, as can be understood from the FIG. 5A illustration. The pressurized water is then fed via a hose from the manifold 520 to each of the one or more hydro-booster components 504. Each hose from the manifold 520 may feed a single hydro-booster 504 or it may feed multiple hydro-boosters. The hoses from the manifold 520 connect to the high-pressure tubing of the hydro-booster as will be described further in connection with FIGS. 6A and 6C.

Returning briefly to the mechanical pump vessel 506, the mechanical pump vessel 506 is a lower hermetic tank that houses a sealed mechanical pump within and having a discharge closed outlet with an open to vessel/tank that, when flooded and the mechanical pump energized, the inside volume of water goes into a state of negative pressure thereby drawing water into the vessel/tank. Advantageously, this design overcomes abrupt clogging damage that is prevalent to most any other pump systems known in the industry for removing debris from a cooling tower system. For prior art systems, any debris larger than the normally used 1.5" or 2" hoses are prone to abruptly blocking the pump inlet. By contrast, embodiments of the present invention, given the fact that the mechanical pump is operating within the flooded vessel, the mechanical pump benefits from a full water volume to cushion abrupt stoppage and continue to operate unharmed even without having flow. In addition, surrounding water within the vessel which provides cooling of the motor long term until any upstream stoppage can be removed (normally by operator shutting off suction tool valve to address the problem) while mechanical pump is allowed to continue to run.

Further to that which has been previously described, embodiments of the solution address commonly encountered gases that are either 1) drawn into the system by suction tools or faulty hose fittings or 2) released from the heavy mud layer build up in a cooling tower basin. The novel system addresses the problem of entrained uncompressible gas/air (which if not removed from mechanical pump vessel will over time accumulate to the point where the mechanical pump will go into a state of cavitation) by removing the gas/air and replacing it with makeup water.

As one of ordinary skill in the art would acknowledge, gases are NOT compressible with a centrifugal pump system. As such, if the gases/air are allowed to reach the suction of the mechanical pump then a hydro pump will cavitate and the system will have to be reprimed. Embodiments of the solution overcome this shortcoming in the prior art by incorporating above the mechanical pump vessel a second vessel—the air evacuation tank 508—that is joined via piping/hosing which are of two deferent dimensions (as can be seen in the FIG. 5A). Both vessels, mechanical pump vessel 506 and air evacuation tank 508, are allowed to operate together as one unit, in the sense that both can be open to each other when isolation valves 516 between the two are open, thereby allowing the air evacuation tank 50 to balance at the same negative pressure state as the lower mechanical pump vessel 506.

Figure 5B:
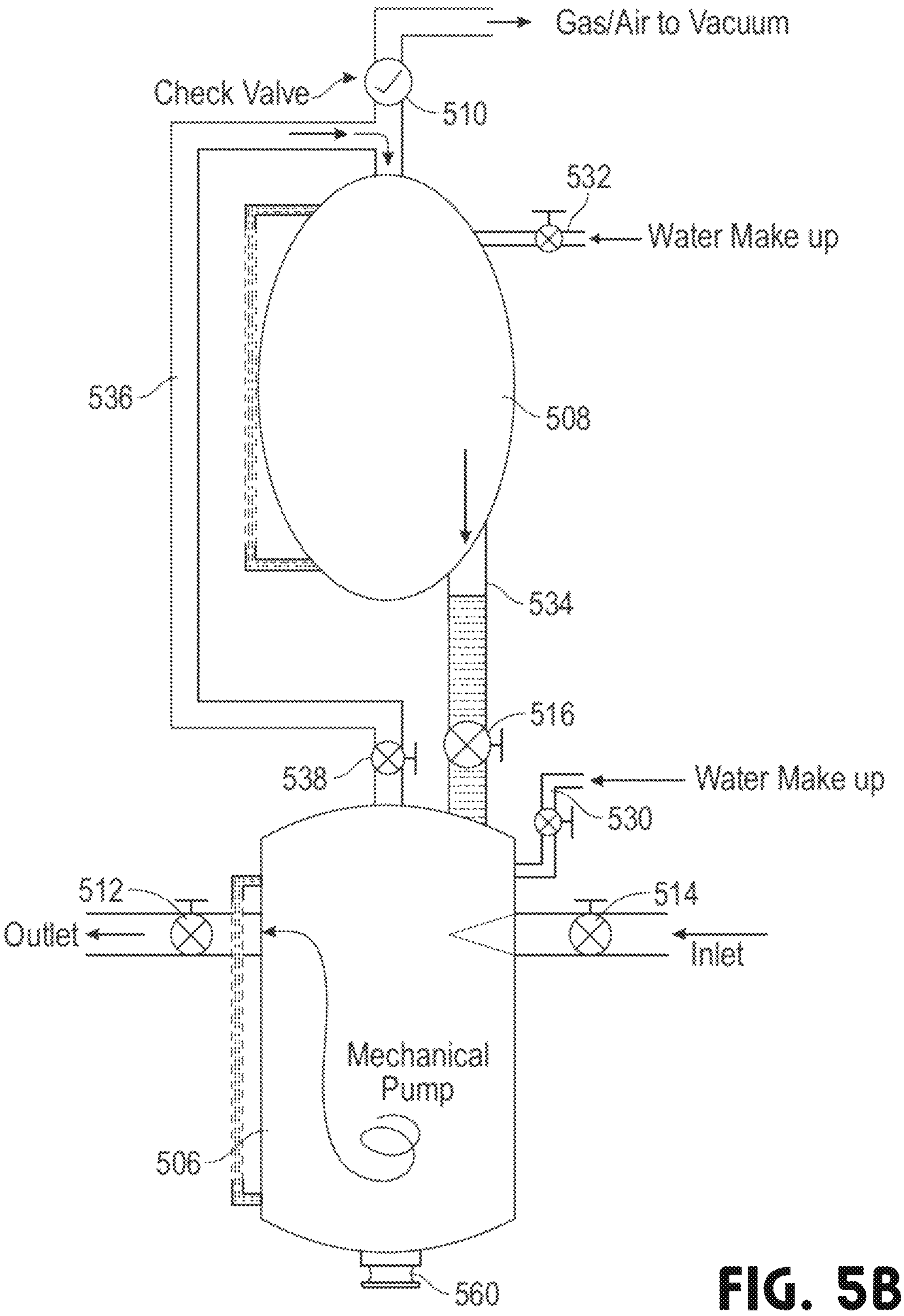
FIG. 5B is a large view of mechanical pump vessel and the air evacuation tank of FIG. 5A.

Looking at FIG. 5B, both upper and lower vessels, mechanical pump vessel 506 and air evacuation tank 508 respectively, are fitted with sight glasses to allow for the observation of fluid or air in either vessel at the same time, as previously described. In addition, each vessel has its own water makeup inlet 530 and 532 respectively (preferably "city water") with cutoff valves to allow for the filling of each vessel independently. At the system starting point, both vessels are flooded/full as well as the remote inlet and outlet hoses to the unit. The vessels have one connecting pipe or hose 534 having a larger diameter (2" in some embodiments) and a smaller size pipe/hose 536 (1" in some embodiments). The larger hose or pipe 534 is fixed to come out of the foremost point of area of the lower vessel (mechanical pump vessel 506) and rises to connect to the underside of the upper vessel (air evacuation tank 508). The smaller 1" hose 536 is located at the highest point of the lower vessel (mechanical pump vessel 506) and is attached to the top of the upper vessel (air evacuation tank 508). In this way, when gases/air are observed in the lower (mechanical pump vessel 506), the two hoses are opened via isolating valves between both vessels 516 and 538 respectively, thereby allowing for both vessels to equalize their negative pressures one with the other. The negative pressure is created by the moving mechanical pump vessel 506. Advantageously, any gases/air migrate from the lower mechanical pump vessel 506 to the upper air evacuation tank 508. This is achieved via "gravity and density." That is, one larger hose 534 has a greater volume of water making it heaver in water weight and located on the underside of the upper air evacuation tank 508 down to the top of the lower mechanical pump vessel 506 while the other smaller hose 536 has less volume and thus less water weight and is open to the top of the upper air evacuation tank 508 to allow the combination of water weight and gravity to take hold and allow gases/air from the lower mechanical pump vessel 506 to escape to the upper air evacuation tank 508. In this way, the water volume in the upper air evacuation tank 508 takes the place of the removed or evacuated gases/air volume allowed to escape to the upper air evacuation tank 508.

At this point both vessels may be isolated from each other, and the upper air evacuation tank 508 refilled quickly via its own makeup inlet 532. The upper air evacuation tank 508 may employ a one-way check valve 510 to expel accumulated gases/air as the upper vessel is being filled and recharged to a full water volume capacity and made ready for a repeated evacuation of the lower tank as its sight glass observation is monitored for any additional gases/air accumulation and thus the process is repeated as needed. Advantageously, embodiments of the system may continue to operate uninterrupted.

The mechanical pump vessel 506 includes a dump valve 560. Debris accumulated within the mechanical pump vessel 506 will settle at the bottom of the mechanical pump vessel 506 and this debris can be extracted from the system via the dump valve 560. The mechanical pump vessel 506 may include a sensor to detect when a threshold amount of debris is present and then automatically open the dump valve 560 so that the debris can be evacuated from the mechanical pump vessel 506 by gravity or by a vacuum source.

Alternatively, the water fed into the mechanical pump vessel 506 can first be passed through a strainer. The strainer operates to filter out dirt and debris as the water passes through the filter and the dirt and debris accumulate in bottom of the strainer. The strainer may include a dump valve for evacuation of the collecting dirt and debris.

It is further envisioned that embodiments of the system could employ lower vacuum vessel above mechanical & accumulation vessels that are maintained at a lower vacuum than the overall system in order to draw gases/air within secondary upper vessel tank to speed the evacuation of air out of system. Such an embodiment would involve a third vessel for holding higher vacuum pressure from an ongoing vacuum pump (diaphragm type for example) that is self-regulating.

Hydro-Booster Components

Embodiments of the hydro-booster components 504 may be inserted/installed in hosing/piping/wands of fluid transfer systems in order to provide a motive force that boosts flow in the system. Pressurized water is supplied to the hydro-booster components in order to generate the motive force. Exemplary embodiments comprise one or more of several benefits as described more fully herein below.

One of the benefits that may be realized from the use of the hydro-booster components 504 is that they allow full flow of fluid from one end straight into and out of the other. Another benefit is that they are modular and thus, can be installed inline with hosing to enhance performance of flow within the hosing having a greater diameter. The design of exemplary hydro-boosters 504 include two or more smaller sidewall inlets (exemplary embodiments have three) and each inlet is positioned at an angle pointing in the direction of flow movement through the hose or pipe. The hydro-boosters 504 have higher pressure forced fluid introduced at the proper angel to the main tube to enhance movement in a straight line of movement of the main body of fluid. In operation, the hydro-boosters 504 converge injected fluid to come together within the main tube body at discharge outlet of tube or just beyond. The hydro-boosters 504 are modular and thus can be installed in the system (hosing or piping) at strategic locations to enhance flow of main body of fluid over normally long distances. However, the hydro-boosters 504 can also be used in other circumstances to overcome heavy sedimentation laden fluid movement. The hydro-boosters 504 present no obstruction of the main inside area of tube/pipe where injected side inlet flow is achieved by orifice delivery in three (not limited to three) simultaneous injected equally positioned (around outer side wall of main piping) to converge on center of main piping outlet at an angle of 10 to 20 degrees respectively as needed and all orifices are located just outside of main piping outer wall in an hermetically sealed inlet tube at the same angle.

Figure 6A:
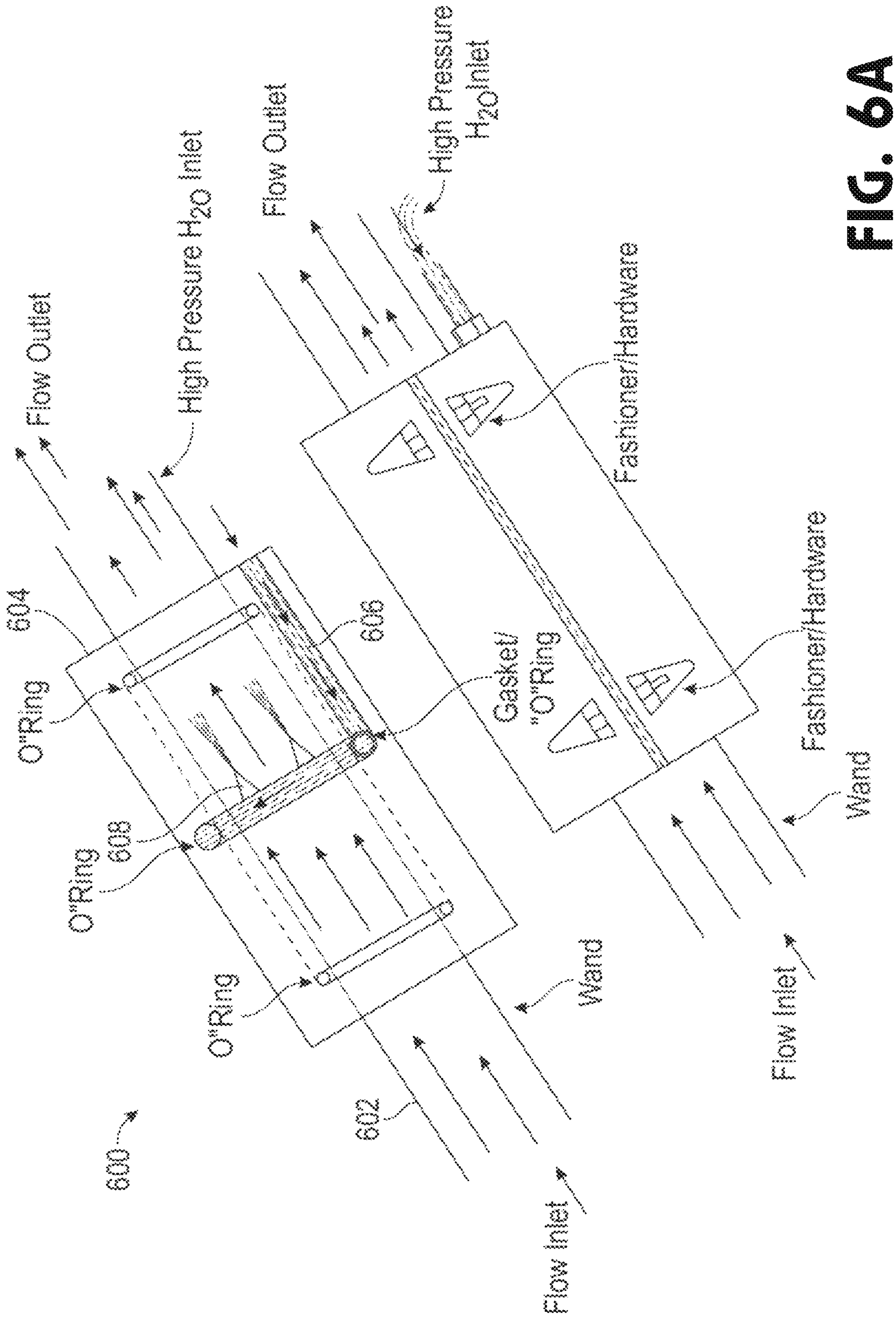
FIG. 6A illustrates the functional operation and interface of an exemplary hydro-booster installed on a hose.
Figure 6B:
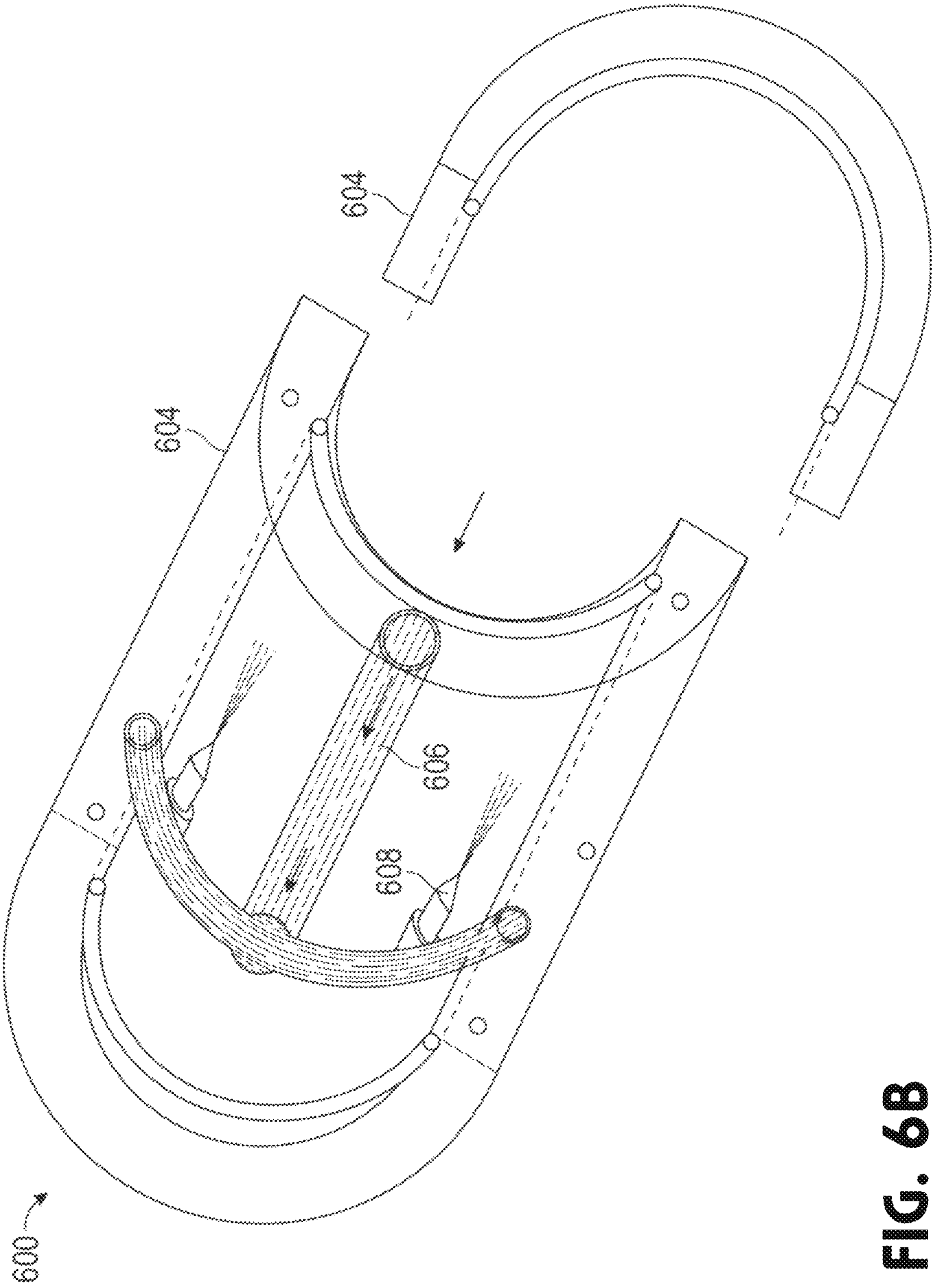
FIG. 6B illustrates the hydro-booster of FIG. 6A prior to being attached.

FIG. 6A illustrates the functional operation and interface of an exemplary hydro-booster installed on a hose. FIG. 6B illustrates the hydro-booster of FIG. 6A prior to being attached. The normal vehicle, such as a hose or wand 602 is illustrated as being encapsulated by a hydro-booster 604. The casing 604 of the hydro-booster 600, which for illustrative purposes is presented and described herein as a two-piece clam shell but other configurations may also apply, includes one or more high-pressure feed tubes 606 terminated by one or more high-pressure nozzles 608. The high-pressure feed tubes 606 and the pressure nozzles 608 set the angle of entry for the high-pressure injection. The hose or wand 602 must be modified to receive the hydro-booster 600. An exemplary embodiment of a hydro-booster component 600 utilizes a two-part clamshell configuration using two semi-circle segments that are fastened to each other around a standard vacuum wand having a low profile. The segments are attached after minor modifications to the hose or wand and will convert a common 1.5" aluminum or steel cleaning hose or wand to a hydro-assist flow hose or wand resulting in a much greater movement of fluid within the hose's or wand's overall volume mass.

The modification includes creating apertures to receive the nozzles 608 of the hydro-booster 600. In some embodiments, a tool can be created that has the same footprint as the hydro-booster 600 with sharp pins that pierce the hose or want 602 when installed. The tool can then be removed leaving the hose or want 602 ready to receive the hydro-booster 600. In other embodiments, the tool may include apertures that can be used to align a drill bit for drilling into the hose or wand 602.

Returning to the exemplary embodiment, the hydro-booster component provides greater flow rates and lift of fluids laden with debris from a lower volume of water. It is designed to convert a standard commercial 1.5 (or other sizes) wand or hose to work much more efficiently in debris removal of sumps, like basins. It can be made to work on other drawing tubular piping such as PVC and others to enhance performance. It uses higher pressure water nozzles installed within half-moon segments directed to an angle of or around (but not limited to) 25 degrees and is allowed to influence volume of water within tubular wand/piping via precut or drilled hole made to tubular sidewalls to allow flow contact with inside flow and thereby influencing a greater flow rate. Its clamshells are configured to mate with dowel pins and internal orifices sealed via O-rings. High pressure jacket openings, or cavities, are sealed via O-rings to allow proper placement of nozzle orifices around tubular/wand to properly influence inside water volume and movement in one direction. The housing is fastened together via hardware that clamps both halves having a low-pressure gasket or neoprene type sealant imbedded within halfmoon housings to create a low pressure or negative pressure seal from atmospheric pressure preventing air intake at installation.

Figure 6C:
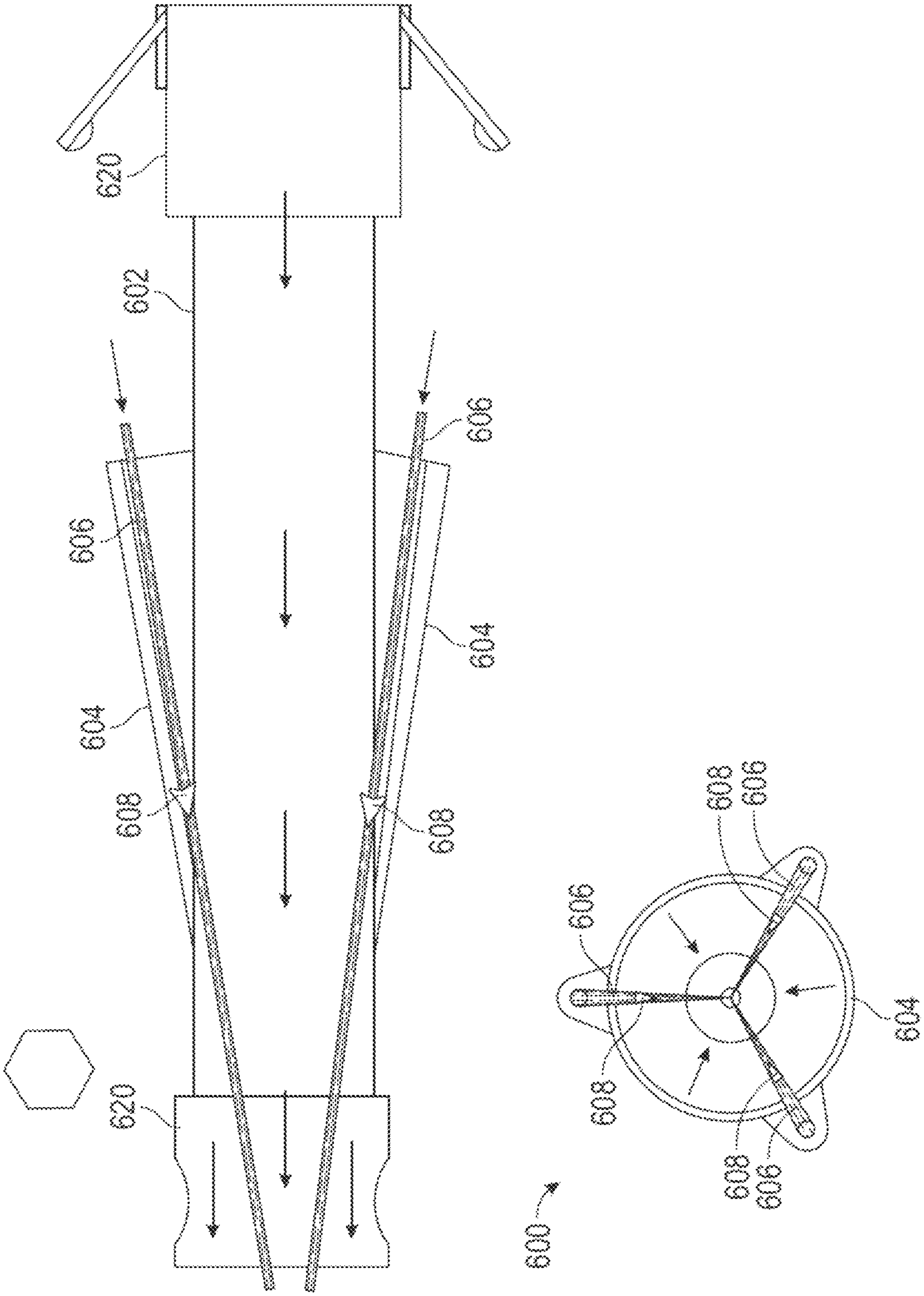
FIG. 6C is another embodiment of a hydro-booster component.

FIG. 6C is another embodiment of a hydro-booster component. The embodiment of FIG. 6C is a similar concept as the exemplary embodiment described with reference to FIG. 6A and FIG. 6B; however, instead of a clam-shell housing it incorporates a quick disconnect fastener 620 for placing the unit inline with a hose or the like. As can be understood from the illustration, the high-pressure water is injected into the main stream of the hose 602 at intervals around the unit and without causing an obstruction or impediment to flow of effluent through the unit.

Figure 6D:
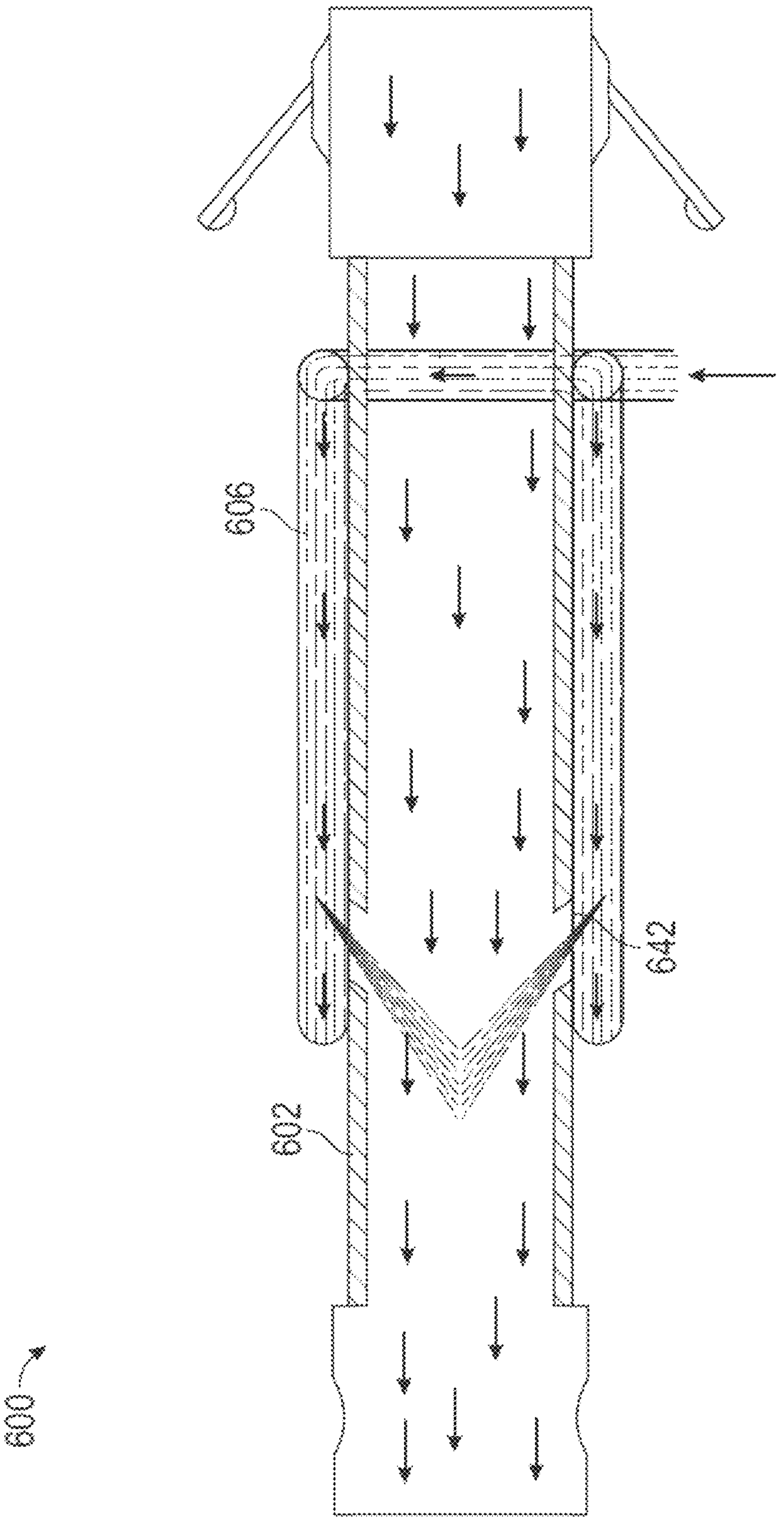
FIG. 6D is yet another embodiment of a hydro-booster component.

FIG. 6D is yet another embodiment of a hydro-booster component. The embodiment of FIG. 6D is a similar concept as the exemplary embodiments described with reference to FIG. 6A and FIG. 6C. The unit has an outer wall mounted high-pressure tubing 606 that allows high-pressure water to enter the main flow pipe 602 via side wall openings 642 that fit and are aligned and evenly spaced around main pipe. In this way, the component works to allow high-pressure water to make contact with internal water moving in one direction. High-pressure thick wall tubing (Aluminum or steel) with welded-on solid end component that is machined internally to create an angled nozzle of appropriate opening size to accommodate for flow rate relevant to pressure used.

It is envisioned that sidewall high-pressure tubing may be machined from round stock solid rod of proper material to withstand higher pressures. Approximately six inches in length drilled on one end to down the stock piece approximately 80% of the full length of the round stock down an off-center orientation, thereby allowing for more or thicker material on one side of the round stock then the other. At the end of the 80% drilled hole location an orifice like hole would be drilled at an angled bore from the side of the round stock where the material is the thickest to allow for directional injection of the high-pressure water to travel and for durability in use. On the inlet to the machined round stock to introduce high-pressure water this would be attached to round tubing in a number of ways, such as, threading the outside to a standard NPT (National Pipe Thread) or welded to normal or common tubing to create a circular manifold to attach the other nozzle units around main pipe to create the Hydro Booster Unit.

Vessel Booster-Hydro Accelerator

Figure 7:
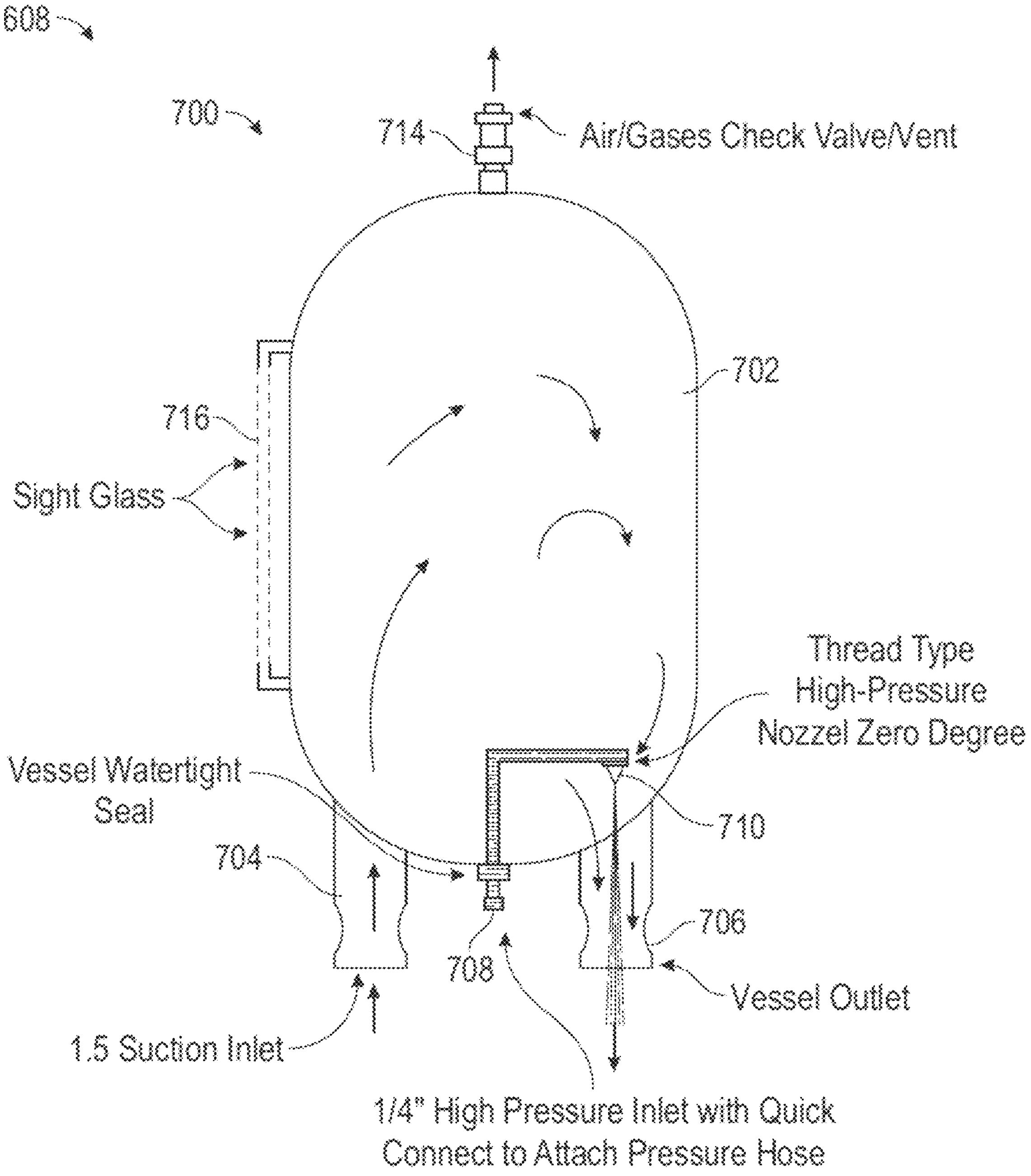
FIG. 7 is a conceptual diagram of a vessel employing the use of a vessel booster with hydro-accelerator.

FIG. 7 is a conceptual diagram of a vessel employing the use of a vessel booster with hydro-accelerator. The vessel 700 of a vessel booster subsystem according to the solution may be placed inline with the overall system. The vessel 700 comprises a hermetic chamber 702 that serves to accumulate air, thereby working to extend performance of system.

Advantageously, the vessel 700 allows for the evacuation of air/gases out of the system. Additionally, the vessel 700 may break down debris within the system piping arrangements via velocity drop 704 at the inlet coupled with an abrupt velocity increase induced by a high pressure at the outlet 706. The vessel 700 allows for greater suction of the system being cleaned without the need of mechanical pumping assistance. It does so by taking advantage of flow differences at inlet 704 and outlet 706 further enhanced by pressure induced flow influence. High pressure flow is induced through the introduction of high-pressure influence at the outlet 706 to enhance performance in certain conditions such as heavily debris laden water or height of water volume being moved. Also, in some embodiments, the vessel allows for the observation of air/gases accumulation within the vessel 700 in order to inform a user for maximum flow rate and performance.

The vessel inlet 704 in an exemplary embodiment is normally reduced from 2" to 1.5" to make use of the velocity change resulting from the flow rate differential, such as by a Venturi effect. The velocity differential works to increase performance at the suction end of the upstream cleaning wand. This is accomplished by having the same volume of water entering the vessel as is being let out of the (hermetic vessel) normally 2" outlet port 706. Thereby, the velocity at the inlet 704 is much greater than the velocity at the outlet 706, as would be understood by one of ordinary skill in fluid dynamics.

High pressure (from typical pressure washer equipment) water is introduced into the vessel 700 via a sealed packing type connector fitting 708 that seals a high-pressured tube/piping that makes a 90-degree turn (within vessel) over towards and over the vessel outlet 706 and then 90-degrees down and over the center of the outlet 706 having a high-pressure nozzle 710 to force a stream of water under pressure down the middle of the vessel's outlet 706 to induce and influence flow out of the vessel's port outlet 706. The high pressure zero-degree nozzle is recessed farther back from the vessel outlet than the outlet diameter in order to mitigate clogging. The zero-degree nozzle with its high pressure also serves as a macerator to break up debris, trash, biofilms, and leaves that are pulled up in the system. The outlet of the vessel is larger (2") in diameter than the inlet (reduced to typically 1.5") so the added push from the nozzle dramatically increases the power/velocity of the suction on the inlet side of the vessel. The push from the nozzle works to increase the power of gravity to enhance the flow.

The vessel may include a check-valve 714 (ball type check-valve, for example) located at the top of the vessel to allow for the evacuation of air/gases introduced into the suction from normal leaks or very common gases within the mud/debris layers of a sump or basin normally used on cooling tower equipment. By securing system water is forced into system forcing water into elevated booster vessel which in turn forces air/gases out of vessel making the overall volume of the vessel fully flooded and thereby hydraulic which is the key to system performance.

The vessel may have a side vertical sight-glass 716 or reinforced clear flex tubing to allow for the observation of water versus air/gases accumulation during operation to determine air evacuation requirements.

Figure 8:
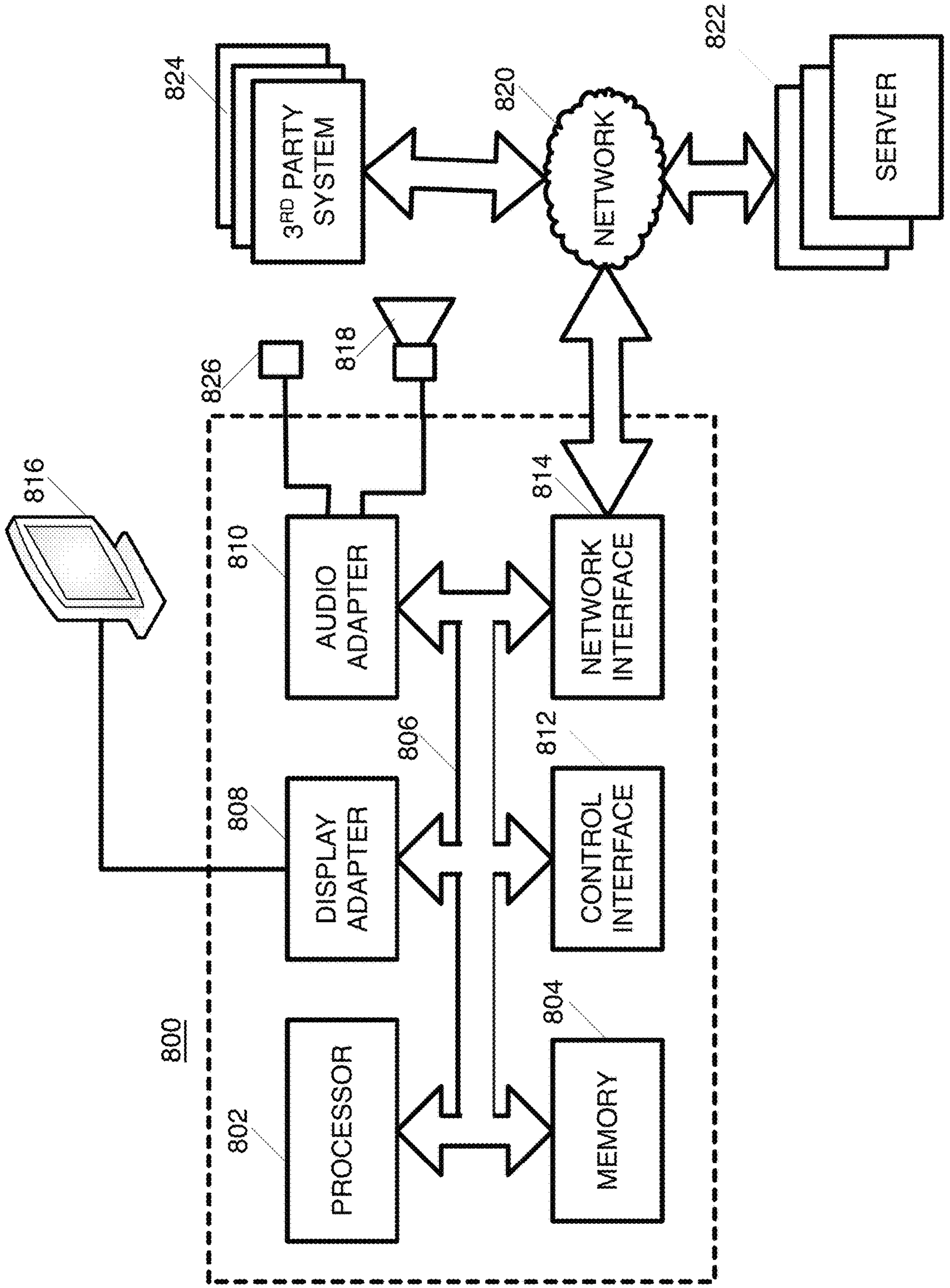
FIG. 8 is a functional block diagram of the components of an exemplary embodiment of system or sub-system operating as a controller or processor 800 that could be used in various embodiments of the disclosure for controlling aspects of the various embodiments.

FIG. 8 is a functional block diagram of the components of an exemplary embodiment of system or sub-system operating as a controller or processor 800 that could be used in various embodiments of the disclosure for controlling aspects of the various embodiments. For example, the presented system of sub-system may be utilized to control various valves in the system, turn on or off certain hydro-accelerators, increase water pressure, sound alarms, detect system issues or problems, detect the presence of debris or gas, automate the movement of a vacuum device for removing of debris, automate the process of inserting the hanging fill access tools, etc. It will be appreciated that not all of the components illustrated in FIG. 8 are required in all embodiments of the activity monitor but, each of the components are presented and described in conjunction with FIG. 8 to provide a complete and overall understanding of the components. The controller can include a general computing platform 800 illustrated as including a processor/memory device 802/804 that may be integrated with each other or, communicatively connected over a bus or similar interface 806. The processor 802 can be a variety of processor types including microprocessors, micro-controllers, programmable arrays, custom IC's etc. and may also include single or multiple processors with or without accelerators or the like. The memory element of 804 may include a variety of structures, including but not limited to RAM, ROM, magnetic media, optical media, bubble memory, FLASH memory, EPROM, EEPROM, etc. The processor 802, or other components in the controller may also provide components such as a real-time clock, analog to digital convertors, digital to analog convertors, etc. The processor 802 also interfaces to a variety of elements including a control interface 812, a display adapter 808, an audio adapter 810, and network/device interface 814. The control interface 812 provides an interface to external controls, such as sensors, actuators, drawing heads, nozzles, cartridges, pressure actuators, leading mechanism, drums, step motors, a keyboard, a mouse, a pin pad, an audio activated device, as well as a variety of the many other available input and output devices or, another computer or processing device or the like. The display adapter 808 can be used to drive a variety of alert elements 816, such as display devices including an LED display, LCD display, one or more LEDs or other display devices. The audio adapter 810 interfaces to and drives another alert element 818, such as a speaker or speaker system, buzzer, bell, etc. The network/interface 814 may interface to a network 820 which may be any type of network including, but not limited to the Internet, a global network, a wide area network, a local area network, a wired network, a wireless network or any other network type including hybrids. Through the network 820, or even directly, the controller 800 can interface to other devices or computing platforms such as one or more servers 822 and/or third-party systems 824. A battery or power source provides power for the controller 800.

Systems, methods, and devices for cooling tower maintenance and repair have been described using detailed descriptions of embodiments thereof that are provided by way of example and are not intended to limit the scope of the disclosure. The described embodiments comprise different features, not all of which are required in all embodiments of the given solutions. Some embodiments of the given solutions utilize only some of the features or possible combinations of the features. Variations of embodiments of the solutions that are described and embodiments of the solutions comprising different combinations of features noted in the described embodiments will occur to persons of the art. It will be appreciated by persons skilled in the art that embodiments according to the solutions are not limited by what has been particularly shown and described herein above. Rather, the scope of the disclosed solutions are defined by the claims that follow.

What is claimed is:

1. A system for maintenance of a cooling tower, the cooling tower including a plurality of hanging fill sheets and a cool water basin of beneath the plurality of hanging fill sheets, the system comprising:
   - at least one hanging fill access tool comprising a flat, elongated arm, the hanging fill access tool having a handle at one end, wherein upon sliding the flat, elongated arm between a first hanging fill sheet and a second hanging fill sheet, the handle can be rotated to cause the flat, elongated arm to turn, thereby separating the first hanging fill sheet and the second hanging fill sheet;
   - a hydro-power cleaning tool having a tool body defining a fluid path between a distal end and a proximate end of the tool body, the hydro-power cleaning tool comprising:
     - an open mouth associated with said distal end of the tool body;
     - a nozzle associated with said proximate end of the tool body; and
     - one or more internal nozzles associated with said distal end of the tool body and operable to direct high-pressure water at an angle towards said proximate end of the tool body to produce a suction force at said open mouth;
   - a scrubber that is fluidly associated with the nozzle of the hydro-power cleaning tool, whereby the hydro-power cleaning tool can be inserted into the cool water basin to extract water laden with debris from the cool water basin and deliver it to the scrubber to remove debris from the extracted water.

2. The system of claim 1, further comprising one or my more hydro-booster components, each hydro-booster component comprising:
   - a clam shell casing; and
   - one or more high-pressure tubes terminating with high-pressure nozzles, wherein:
     - the one or more hydro-booster components are mounted in the system such that the high-pressure nozzles are angled to promote an increased fluid flow rate.

3. The system of claim 2, wherein the scrubber further comprises:
   - a mechanical pump vessel fluidly associated with the nozzle of the hydro-power cleaning tool and configured to receive extracted water with debris; and
   - an air evacuation tank fluidly associated with the mechanical pump vessel.

4. The system of claim 3, wherein the mechanical pump vessel is positioned below the air evacuation tank and the scrubber further comprises:
   - a large diameter hose creating a fluid path from the lower side of the air evacuation tank to the upper side of the mechanical pump vessel;
   - a small diameter hose creating a fluid path from the upper side of the mechanical pump vessel to the upper side of the air evacuation tank; and
   - whereby gases existing in the mechanical pump vessel is are forced into the small diameter hose to be extracted at the air evacuation tank.

5. The system of claim 4, wherein the large diameter hose has a shut off valve and the small diameter hose has a shut off valve, whereby when the large diameter hose shut off valve is open and the small diameter hose shut off valve is open, the combination of water weight and gravity force the gases from the mechanical pump vessel to the air evacuation tank.

6. The system of claim 5, wherein the air evacuation tank includes a water makeup inlet, whereby volume formerly occupied by extracted gases can be filled by water.

7. The system of claim 6, further comprising a distribution pressure regulating manifold that provides pressurized water to one or more of the hydro-booster components.

8. The system of claim 7, further comprising a pressure washer that can be used to clean debris from the hanging fill sheets, the pressure washer comprising:
   - a feed hose fluidly associated with the scrubber; and
   - one of said hydro-booster components associated with the feed hose, whereby water scrubbed by the scrubber can be pressurized and delivered to the pressure washer.

9. The system of claim 7, wherein the tool body of the hydro-power cleaning tool has a height of one (1) inch or less.

10. The system of claim 7, further comprising a strainer positioned inline between the hydro-power cleaning tool and the mechanical pump vessel, whereby dirt and debris can be filtered from the water being provided to the mechanical pump vessel.

11. The system of claim 1, further comprising one or more hydro-booster components, each hydro-booster component comprising:
   - a tube with a first quick-connect connector on a distal end of the tube;
   - a second quick-connect connector on a proximate end of the tube; and
   - one or more high-pressure tubes terminating with high-pressure nozzles angled towards the distal end of the tube, whereby when the first quick-connect connector and the second quick-connect connector are mounted to a fluid path in the system, high-pressure water from the high-pressure nozzles increases the negative pressure within the fluid path to increase a flow rate within the fluid path.

12. The system of claim 11, wherein the scrubber further comprises:
   - a mechanical pump vessel fluidly associated with the nozzle of the hydro-power cleaning tool, whereby extracted water with debris can be received into the mechanical pump vessel; and
   - an air evacuation tank fluidly associated with the mechanical pump vessel.

13. The system of claim 12, wherein the mechanical pump vessel is positioned below the air evacuation tank and the scrubber further comprises:
   - a large diameter hose creating a fluid path from the lower side of the air evacuation tank to the upper side of the mechanical pump vessel;
   - a small diameter hose creating a fluid path from the upper side of the mechanical pump vessel to the upper side of the air evacuation tank; and
   - whereby gases existing in the mechanical pump vessel are forced into the small diameter hose to be extracted at the air evacuation tank.

14. The system of claim 13, wherein the large diameter hose has a shut off valve and the small diameter hose has a shut off valve, whereby when the large diameter hose shut off valve is open and the small diameter hose shut off valve is open, the combination of water weight and gravity force the gases from the mechanical pump vessel to the air evacuation tank.

15. The system of claim 14, wherein the air evacuation tank includes a water makeup inlet, whereby volume formerly occupied by extracted gases can be filled by water.

16. The system of claim 15, further comprising a distribution pressure regulating manifold that provides pressurized water to one or more of the hydro-booster components.

17. The system of claim 16, further comprising a pressure washer that can be used to clean debris from the hanging fill sheets, the pressure washer comprising:

a feed hose fluidly associated with the scrubber; and a one of said hydro-booster components associated with the feed hose, whereby water scrubbed by the scrubber can be pressurized and delivered to the pressure washer.

18. The system of claim 16, wherein the tool body of the hydro-power cleaning tool has a height of one (1) inch or less.

19. The system of claim 16, further comprising a strainer positioned inline between the hydro-power cleaning tool and the mechanical pump vessel, whereby dirt and debris can be filtered from the water being provided to the mechanical pump vessel.

* * * * *